United States Patent
Hayashi

(10) Patent No.: US 8,106,624 B2
(45) Date of Patent: Jan. 31, 2012

(54) BATTERY PACK, CHARGING DEVICE, AND ELECTRONIC DEVICE AND OBTAINING A CHARGE STATE THEREOF

(75) Inventor: Isao Hayashi, Yokohama (JP)

(73) Assignee: Canon Kabushiki Kaisha (JP)

( * ) Notice: Subject to any disclaimer, the term of this patent is extended or adjusted under 35 U.S.C. 154(b) by 590 days.

(21) Appl. No.: 12/124,415

(22) Filed: May 21, 2008

(65) Prior Publication Data

US 2008/0290833 A1 Nov. 27, 2008

(30) Foreign Application Priority Data

May 23, 2007 (JP) ................ 2007-137095

(51) Int. Cl.
*H02J 7/00* (2006.01)
(52) U.S. Cl. ....................... 320/106; 324/435
(58) Field of Classification Search ............. 320/106
See application file for complete search history.

(56) References Cited

U.S. PATENT DOCUMENTS

| 5,572,110 | A | * | 11/1996 | Dunstan | .......... | 320/106 |
| 7,098,627 | B2 | * | 8/2006 | Nishida | .......... | 320/159 |
| 7,492,126 | B2 | | 2/2009 | Hogari et al. | | |

FOREIGN PATENT DOCUMENTS

| CN | 1601296 A | 3/2005 |
| JP | 6-310179 A | 11/1994 |
| JP | 08-019187 A | 1/1996 |
| JP | 2001-266957 A | 9/2001 |
| JP | 2002-214310 A | 7/2002 |

OTHER PUBLICATIONS

Notification of First Office Action issued in corresponding Chinese Patent Application No. 200810098313.X dated Oct. 9, 2009.
Office Action issued Nov. 22, 2011 for corresponding JP2007-137095.

* cited by examiner

*Primary Examiner* — Arun Williams
(74) *Attorney, Agent, or Firm* — Rossi, Kimms & McDowell LLP

(57) ABSTRACT

A charging device which enables the charged state and remaining capacity of the battery pack to be accurately grasped. In the charging device on which a battery pack including a nonvolatile memory and a secondary battery cell is mounted, a charge control microcomputer measures a charging current supplied to and a charging voltage applied to the battery pack. Charged state data indicative of the charged state of the battery pack is determined based on at least one of the measured charging current and the measured charging voltage. The charge control microcomputer writes the determined charged state data in the memory of the battery pack.

10 Claims, 32 Drawing Sheets

- IDENTIFICATION DATA
- CHARGING CHARACTERISTICS DATA
- CHARGED STATE DATA 1 AND 2
- CHARGE COUNT DATA
- FULL CHARGE CAPACITY DATA
- CHARGE-TIME TEMPERATURE DATA
- CHARGE-TIME TEMPERATURE CHARACTERISTIC DATA
- CHARGE HISTORY DATA
- DISCHARGING CHARACTERISTICS DATA
- CHARGE CYCLE-INDUCED DETERIORATION CORRECTION TABLE
- LEFT-CHARGED STATE-INDUCED DETERIORATION CORRECTION TABLE
- DISCHARGE-TIME TEMPERATURE LOAD CHARACTERISTIC DATA TABLE

FIG. 11A

CHARGE-TIME TEMPERATURE: NOT LOWER THAN 15 °C AND LOWER THAN 35 °C

| CHARGED STATE DATA 1 | CHARGING VOLTAGE | CHARGING CURRENT | FULL CHARGE CAPACITY RATIO |
|---|---|---|---|
| LB | 2.50<Vb<3.86V | 370mA≦Ichg | 1~5% |
| STATE 1 | 3.86V≦Vb<3.90V | 370mA≦Ichg | 6~10% |
| STATE 2 | 3.90V≦Vb<3.94V | 370mA≦Ichg | 11~20% |
| STATE 3 | 3.94V≦Vb<3.98V | 370mA≦Ichg | 21~30% |
| STATE 4 | 3.98V≦Vb<4.00V | 370mA≦Ichg | 31~40% |
| STATE 5 | 4.00V≦Vb<4.04V | 370mA≦Ichg | 41~50% |
| STATE 6 | 4.04V≦Vb<4.06V | 370mA≦Ichg | 51~60% |
| STATE 7 | 4.06V≦Vb<4.07V | 370mA≦Ichg | 61~70% |
| STATE 8 | 4.07V≦Vb<4.08V | 370mA≦Ichg | 71~80% |
| STATE 9 | 4.08V≦Vb | 180mA≦Ichg<370mA | 81~90% |
| STATE 10 | 4.08V≦Vb | 140mA≦Ichg<180mA | 91~95% |
| Full | 4.08V≦Vb | Ichg<140mA | 96~100% |

FIG. 11B

CHARGE-TIME TEMPERATURE: LOWER THAN 15 °C

| CHARGED STATE DATA 1 | CHARGING VOLTAGE | CHARGING CURRENT | FULL CHARGE CAPACITY RATIO |
|---|---|---|---|
| LB | 2.50<Vb<3.94V | 560mA≦Ichg | 1~5% |
| STATE 1 | 3.94V≦Vb<3.96V | 560mA≦Ichg | 6~10% |
| STATE 2 | 3.96V≦Vb<4.00V | 560mA≦Ichg | 11~20% |
| STATE 3 | 4.00V≦Vb<4.02V | 560mA≦Ichg | 21~30% |
| STATE 4 | 4.02V≦Vb<4.06V | 560mA≦Ichg | 31~40% |
| STATE 5 | 4.06V≦Vb<4.08V | 560mA≦Ichg | 41~50% |
| STATE 6 | 4.08V≦Vb | 450mA≦Ichg<560mA | 51~60% |
| STATE 7 | 4.08V≦Vb | 370mA≦Ichg<450mA | 61~70% |
| STATE 8 | 4.08V≦Vb | 310mA≦Ichg<370mA | 71~80% |
| STATE 9 | 4.08V≦Vb | 180mA≦Ichg<310mA | 81~90% |
| STATE 10 | 4.08V≦Vb | 160mA≦Ichg<180mA | 91~95% |
| Full | 4.08V≦Vb | Ichg<160mA | 96~100% |

FIG. 11C

CHARGE-TIME TEMPERATURE: NOT LOWER THAN 35 °C

| CHARGED STATE DATA 1 | CHARGING VOLTAGE | CHARGING CURRENT | FULL CHARGE CAPACITY RATIO |
|---|---|---|---|
| LB | 2.50V<Vb<3.64V | 400mA≦Ichg | 1~5% |
| STATE 1 | 3.64V≦Vb<3.88V | 400mA≦Ichg | 6~10% |
| STATE 2 | 3.88V≦Vb<3.92V | 400mA≦Ichg | 11~20% |
| STATE 3 | 3.92V≦Vb<3.94V | 400mA≦Ichg | 21~30% |
| STATE 4 | 3.94V≦Vb<3.88V | 400mA≦Ichg | 31~40% |
| STATE 5 | 3.98V≦Vb<4.00V | 400mA≦Ichg | 41~50% |
| STATE 6 | 4.00V≦Vb<4.04V | 400mA≦Ichg | 51~60% |
| STATE 7 | 4.04V≦Vb<4.06V | 400mA≦Ichg | 61~70% |
| STATE 8 | 4.06V≦Vb<4.08V | 400mA≦Ichg | 71~80% |
| STATE 9 | 4.08V≦Vb | 220mA≦Ichg<400mA | 81~90% |
| STATE 10 | 4.08V≦Vb | 180mA≦Ichg<220mA | 91~95% |
| Full | 4.08V≦Vb | Ichg<160mA | 96~100% |

FIG. 12

CHARGE-TIME TEMPERATURE:
NOT LOWER THAN 15 °C AND LOWER THAN 35 °C
FULL CHARGE CAPACITY: 700 mAh

| CHARGED STATE DATA 1 | CHARGED STATE DATA 2 | CHARGING VOLTAGE | CHARGING CURRENT | FULL CHARGE CAPACITY RATIO | CHARGE CAPACITY [mAh] |
|---|---|---|---|---|---|
| LB | 1 | 2.50V≦Vb<2.772V | 370mA≦Ichg | 1% | 7 |
|  | 2 | 2.772V≦Vb<3.044V |  | 2% | 14 |
|  | 3 | 3.044V≦Vb<3.316V |  | 3% | 21 |
|  | 4 | 3.316V≦Vb<3.588V |  | 4% | 28 |
|  | 5 | 3.598V≦Vb<3.860V |  | 5% | 35 |
| STATE 1 | 6 | 3.860V≦Vb<3.868V | 370mA≦Ichg | 6% | 42 |
|  | 7 | 3.868V≦Vb<3.876V |  | 7% | 49 |
|  | 8 | 3.876V≦Vb<3.884V |  | 8% | 56 |
|  | 9 | 3.884V≦Vb<3.892V |  | 9% | 63 |
|  | 10 | 3.892V≦Vb<3.900V |  | 10% | 70 |
| STATE 2 | 1 | 3.900V≦Vb<3.904V | 370mA≦Ichg | 11% | 77 |
|  | 2 | 3.904V≦Vb<3.908V |  | 12% | 84 |
|  | 3 | 3.908V≦Vb<3.912V |  | 13% | 91 |
|  | 4 | 3.912V≦Vb<3.916V |  | 14% | 98 |
|  | 5 | 3.916V≦Vb<3.920V |  | 15% | 105 |
|  | 6 | 3.920V≦Vb<3.924V |  | 16% | 112 |
|  | 7 | 3.924V≦Vb<3.928V |  | 17% | 119 |
|  | 8 | 3.928V≦Vb<3.932V |  | 18% | 126 |
|  | 9 | 3.932V≦Vb<3.936V |  | 19% | 133 |
|  | 10 | 3.936V≦Vb<3.940V |  | 20% | 140 |
| STATES 3 to 9 | ⋮ | 3.940≦Vb<4.08V | ⋮ | 21~90% | 140~630 |
| STATE 10 | 1 | 4.08V≦Vb | 172mA≦Ichg<180mA | 91% | 637 |
|  | 2 |  | 164mA≦Ichg<172mA | 92% | 644 |
|  | 3 |  | 156mA≦Ichg<164mA | 93% | 651 |
|  | 4 |  | 148mA≦Ichg<158mA | 94% | 658 |
|  | 5 |  | 140mA≦Ichg<146mA | 95% | 665 |
| Full | 6 | 4.08V≦Vb | 130mA≦Ichg<140mA | 96% | 672 |
|  | 7 |  | 120mA≦Ichg<130mA | 97% | 679 |
|  | 8 |  | 110mA≦Ichg<120mA | 98% | 686 |
|  | 9 |  | 100mA≦Ichg<110mA | 99% | 693 |
|  | 10 |  | Ichg<100mA | 100% | 700 |

FIG. 15

| CHARGED STATE DATA 1 | CHARGE MEASUREMENT RESULT | LEFT-CHARGED STATE-INDUCED DETERIORATION CORRECTION VALUE [mAh] |
|---|---|---|
| Full | Full | 0 |
| | STATE 10 | 0 |
| | STATE 9 | 1 |
| | STATE 8 | 2 |
| | STATE 7 | 3 |
| | STATE 6 | 4 |
| | STATE 5 | 5 |
| | STATE 4 | 6 |
| | STATE 3 | 7 |
| | STATE 2 | 8 |
| | STATE 1 | 9 |
| | LB | 10 |
| STATE 10 | Full | 0 |
| | STATE 10 | 0 |
| | STATE 9 | 0 |
| | STATE 8 | 0.5 |
| | STATE 7 | 1 |
| | STATE 6 | 1.5 |
| | STATE 5 | 2 |
| | STATE 4 | 2.5 |
| | STATE 3 | 3 |
| | STATE 2 | 3.5 |
| | STATE 1 | 4 |
| | LB | 4.5 |
| STATE 9 - | ⋮ | ⋮ |

*FIG. 16*

| CHARGE CYCLE COUNT | CHARGE CYCLE-INDUCED DETERIORATION CORRECTION VALUE [mAh] |
|---|---|
| 1~50 | 0.42 |
| 51~100 | 0.7 |
| 101~150 | 0.98 |

FIG. 26A

CHARGE-TIME TEMPERATURE:
NOT LOWER THAN 15 °C AND LOWER THAN 35 °C

| CHARGED STATE DATA 1 | OUTPUT VOLTAGE (DISCHARGE OUTPUT: 1 W) | FULL CHARGE CAPACITY RATIO (DISCHARGE OUTPUT: 1 W) | REMAINING CAPACITY [mAh] |
|---|---|---|---|
| LB | 3.10V<Vb<3.18V | 1~5% | 6.65~33.25 |
| STATE 1 | 3.18V≦Vb<3.26V | 6~10% | 39.9~66.5 |
| STATE 2 | 3.26V≦Vb<3.36V | 11~20% | 73.15~133 |
| STATE 3 | 3.36V≦Vb<3.44V | 21~30% | 139.65~109.5 |
| STATE 4 | 3.44V≦Vb<3.50V | 31~40% | 206.15~268 |
| STATE 5 | 3.50V≦Vb<3.54V | 41~50% | 272.65~332.5 |
| STATE 6 | 3.54V≦Vb<3.60V | 51~60% | 339.15~399 |
| STATE 7 | 3.60V≦Vb<3.66V | 61~70% | 405.65~465.5 |
| STATE 8 | 3.66V≦Vb<3.70V | 71~80% | 472.15~532 |
| STATE 9 | 3.70V≦Vb<3.80V | 81~90% | 538.65~598.5 |
| STATE 10 | 3.80V≦Vb<3.98V | 91~95% | 605.15~631.75 |
| Full | 3.98V≦Vb | 96~100% | 638.4~665 |

FIG. 26B

CHARGE-TIME TEMPERATURE: LOWER THAN 15 °C

| CHARGED STATE DATA 1 | OUTPUT VOLTAGE (DISCHARGE OUTPUT: 1 W) | FULL CHARGE CAPACITY RATIO (DISCHARGE OUTPUT: 1 W) | REMAINING CAPACITY [mAh] |
|---|---|---|---|
| LB | 3.10V<Vb<3.18V | 1~5% | 6.65~31.5 |
| STATE 1 | 3.18V≦Vb<3.26V | 6~10% | 37.8~63 |
| STATE 2 | 3.26V≦Vb<3.36V | 11~20% | 69.3~126 |
| STATE 3 | 3.36V≦Vb<3.44V | 21~30% | 132.3~189 |
| STATE 4 | 3.44V≦Vb<3.50V | 31~40% | 185.3~252 |
| STATE 5 | 3.50V≦Vb<3.54V | 41~50% | 258.3~315 |
| STATE 6 | 3.54V≦Vb<3.60V | 51~60% | 321.3~378 |
| STATE 7 | 3.60V≦Vb<3.65V | 61~70% | 384.3~441 |
| STATE 8 | 3.65V≦Vb<3.68V | 71~80% | 447.3~504 |
| STATE 9 | 3.68V≦Vb<3.75V | 81~90% | 510.3~567 |
| STATE 10 | 3.75V≦Vb<3.90V | 91~95% | 578.3~598.5 |
| Full | 3.90V≦Vb | 96~100% | 604.8~630 |

FIG. 26C

CHARGE-TIME TEMPERATURE: NOT LOWER THAN 35 °C

| CHARGED STATE DATA 1 | OUTPUT VOLTAGE (DISCHARGE OUTPUT: 1 W) | FULL CHARGE CAPACITY RATIO (DISCHARGE OUTPUT: 1 W) | REMAINING CAPACITY [mAh] |
|---|---|---|---|
| LB | 3.10V<Vb<3.18V | 1~5% | 6.65~33.6 |
| STATE 1 | 3.18V≦Vb<3.27V | 6~10% | 40.32~67.2 |
| STATE 2 | 3.27V≦Vb<3.37V | 11~20% | 73.92~134.4 |
| STATE 3 | 3.37V≦Vb<3.46V | 21~30% | 141.12~201.6 |
| STATE 4 | 3.46V≦Vb<3.52V | 31~40% | 208.32~268.8 |
| STATE 5 | 3.52V≦Vb<3.57V | 41~50% | 275.52~336 |
| STATE 6 | 3.57V≦Vb<3.63V | 51~60% | 342.72~403.2 |
| STATE 7 | 3.63V≦Vb<3.70V | 61~70% | 409.92~470.4 |
| STATE 8 | 3.70V≦Vb<3.74V | 71~80% | 477.12~537.6 |
| STATE 9 | 3.74V≦Vb<3.85V | 81~90% | 544.32~604.8 |
| STATE 10 | 3.85V≦Vb<4.03V | 91~95% | 611.52~638.4 |
| Full | 4.03V≦Vb | 96~100% | 645.12~672 |

FIG. 27

FULL CHARGE CAPACITY: 100 mAh,
CHARGE-TIME TEMPERATURE:
NOT LOWER THAN 15 °C AND LOWER THAN 35 °C
DISCHARGE-TIME TEMPERATURE:
NOT LOWER THAN 15 °C AND LOWER THAN 35 °C

| CHARGED STATE DATA 1 | CHARGED STATE DATA 2 | OUTPUT VOLTAGE (DISCHARGE OUTPUT: 1 W) | FULL CHARGE CAPACITY RATIO (DISCHARGE OUTPUT: 1 W) | REMAINING CAPACITY [mAh] |
|---|---|---|---|---|
| LB | 1 | $3.100V \leq Vb < 3.116V$ | 1% | 6.65 |
|  | 2 | $3.116V \leq Vb < 3.132V$ | 2% | 13.3 |
|  | 3 | $3.132V \leq Vb < 3.148V$ | 3% | 19.95 |
|  | 4 | $3.148V \leq Vb < 3.164V$ | 4% | 26.6 |
|  | 5 | $3.164V \leq Vb < 3.180V$ | 5% | 33.25 |
| STATE 1 | 6 | $3.180V \leq Vb < 3.196V$ | 6% | 39.9 |
|  | 7 | $3.186V \leq Vb < 3.212V$ | 7% | 46.55 |
|  | 8 | $3.212V \leq Vb < 3.228V$ | 8% | 56.2 |
|  | 9 | $3.228V \leq Vb < 3.244V$ | 9% | 59.85 |
|  | 10 | $3.244V \leq Vb < 3.260V$ | 10% | 66.5 |
| STATE 2 | 1 | $3.260V \leq Vb < 3.270V$ | 11% | 73.15 |
|  | 2 | $3.270V \leq Vb < 3.280V$ | 12% | 79.8 |
|  | 3 | $3.280V \leq Vb < 3.290V$ | 13% | 86.45 |
|  | 4 | $3.290V \leq Vb < 3.300V$ | 14% | 93.1 |
|  | 5 | $3.300V \leq Vb < 3.310V$ | 15% | 99.75 |
|  | 6 | $3.310V \leq Vb < 3.320V$ | 16% | 106.4 |
|  | 7 | $3.320V \leq Vb < 3.330V$ | 17% | 113.05 |
|  | 8 | $3.330V \leq Vb < 3.340V$ | 18% | 119.7 |
|  | 9 | $3.340V \leq Vb < 3.350V$ | 19% | 126.35 |
|  | 10 | $3.350V \leq Vb < 3.360V$ | 20% | 133 |
| STATES 3 to 9 | ⋮ | $3.360 \leq Vb < 3.800V$ | 21~90% | 139.65~598.5 |
| STATE 10 | 1 | $3.800V \leq Vb < 3.836V$ | 91% | 605.15 |
|  | 2 | $3.836V \leq Vb < 3.872V$ | 92% | 611.8 |
|  | 3 | $3.872V \leq Vb < 3.906V$ | 93% | 618.45 |
|  | 4 | $3.903V \leq Vb < 3.944V$ | 94% | 625.1 |
|  | 5 | $3.944V \leq Vb < 3.980V$ | 95% | 631.75 |
| Full | 6 | $3.980V \leq Vb < 3.994V$ | 96% | 638.4 |
|  | 7 | $3.994V \leq Vb < 4.008V$ | 97% | 645.65 |
|  | 8 | $4.008V \leq Vb < 4.022V$ | 98% | 651.7 |
|  | 9 | $4.022V \leq Vb < 4.036V$ | 99% | 658.35 |
|  | 10 | $4.036V \leq Vb$ | 100% | 665 |

FIG. 30

| CHARGE-TIME TEMPERATURE CHARACTERISTIC | | FULL CHARGE CAPACITY EFFICIENCY (COMPARED TO THAT OF CHARGING AT NOT LOWER THAN 15 °C AND LOWER THAN 35 °C) |
|---|---|---|
| CHARGE-TIME TEMPERATURE | < 15 °C | 0.92 |
| | ≧ 35 °C | 1.02 |

WITH REFERENCE TO FULL CHARGE CAPACITY EFFICIENCY OF 1 SET FOR CONDITION OF CHARGE-TIME TEMPERATURE OF NOT LOWER THAN 15 °C AND LOWER THAN 35 °C.

FIG. 31

| OPERATION MODE | POWER CONSUMPTION |
|---|---|
| REC | 2W |
| PLAY | 1W |
| ⋮ | ⋮ |

FIG. 32

| OPERATION MODE | ACTUALLY USABLE TIME COEFFICIENT |
|---|---|
| REC | 0.6 |
| PLAY | 0.8 |
| ⋮ | ⋮ |

FIG. 33

| DISCHARGE-TIME TEMPERATURE LOAD CHARACTERISTIC | | DISCHARGE EFFICIENCY (COMPARED TO THAT OF DISCHARGING AT DISCHARGE OUTPUT OF 0.5 W AT NOT LOWER THAN 15 °C AND LOWER THAN 35 °C) | |
|---|---|---|---|
| | | 1W | 2W |
| DISCHARGE-TIME TEMPERATURE | < 15 °C | 0.9 | 0.8 |
| | ≧ 15 °C AND < 35 °C | 0.95 | 0.93 |
| | ≧ 35 °C | 0.96 | 0.94 |

WITH REFERENCE TO DISCHARGE EFFICIENCY OF 1 SET FOR CONDITION OF DISCHARGE OUTPUT OF 0.5 W AND DISCHARGE-TIME TEMPERATURE OF NOT LOWER THAN 15 °C AND LOWER THAN 35 °C.

BATTERY PACK, CHARGING DEVICE, AND ELECTRONIC DEVICE AND OBTAINING A CHARGE STATE THEREOF

BACKGROUND OF THE INVENTION

1. Field of the Invention

The present invention relates to a battery pack provided with a memory and a secondary battery, a charging device for charging the battery pack, and an electronic device using the battery pack as a power supply.

2. Description of the Related Art

Conventionally, some types of battery packs for use in an electronic device are provided with a nonvolatile memory for storing a nominal charge capacity value and a remaining charge capacity value.

Further, there has been proposed a charging device for charging a battery pack of the above-mentioned type, in which the remaining charge capacity value is calculated based on a result of electric current integration and an initial remaining charge capacity value and a nominal remaining charge capacity value stored in a nonvolatile memory, and the initial remaining charge capacity value is rewritten into the calculated present remaining charge capacity value (see e.g. Japanese Patent Laid-Open Publication No. H06-310179).

Furthermore, an electronic device on which such a battery pack is mounted is configured to be capable of calculating a battery available time period from the present remaining charge capacity value and a load current.

In techniques typified by the above-mentioned prior art, however, since the remaining charge capacity value is stored in the nonvolatile memory, the calculation of the integral of charging current and that of load current is indispensable. With this configuration, it is impossible to accurately measure an electric current in the case of an electronic load where rush current frequently occurs, which is a factor causing an accuracy error in the measurement of the remaining charge capacity. Further, it is required to provide a device for measuring a current value on a power supply line, which causes a drop in voltage, thereby impeding improvement of power efficiency.

SUMMARY OF THE INVENTION

The present invention provides a battery pack, a charging device, and an electronic device which enable the charged state and remaining capacity of the battery pack to be accurately grasped.

In a first aspect of the present invention, there is provided a charging device on which a battery pack including a memory and a secondary battery is mounted, comprising a charging current-measuring unit configured to measure a charging current supplied to the battery pack, a charging voltage-measuring unit configured to measure a charging voltage applied to the battery pack, a charged state data-determining unit configured to determine charged state data indicative of a charged state of the battery pack, based on at least one of the measured charging current and the measured charging voltage, and a writing unit configured to write the determined charged state data in the memory of the battery pack.

With the arrangement of the first aspect of the present invention, it is possible to accurately manage the charged state of the battery pack being charged by the charging device.

In a second aspect of the present invention, there is provided an electronic device on which a battery pack including a memory and a secondary battery is mounted, comprising an output voltage-measuring unit configured to measure an output voltage from the battery pack, a charged state data-determining unit configured to determine charged state data indicative of a charged state of the battery pack, based on the measured output voltage, and a writing unit configured to write the determined charged state data in the memory of the battery pack.

With the arrangement of the second aspect of the present invention, it is possible to achieve accurate management of the remaining capacity of the battery pack mounted on the electronic device.

In a third aspect of the present invention, there is provided a battery pack for being mounted on a charging device that determines charged state data indicative of a charged state of the battery pack based on at least one of a charging current supplied to and a charging voltage applied to the battery pack, wherein the battery pack includes a memory in which the determined charged state data is written.

In a fourth aspect of the present invention, there is provided a battery pack for being mounted on an electronic device that determines charged state data indicative of a charged state of the battery pack based on an output voltage from the battery pack mounted thereon, wherein the battery pack includes a memory in which the determined charged state data is written.

In a fifth aspect of the present invention, there is provided a method of controlling a charging device on which a battery pack including a memory and a secondary battery is mounted, comprising a charging current-measuring step of measuring a charging current supplied to the battery pack, a charging voltage-measuring step of measuring a charging voltage applied to the battery pack, a charged state data-determining step of determining charged state data indicative of a charged state of the battery pack, based on at least one of the measured charging current and the measured charging voltage, and a writing step of writing the determined charged state data in the memory of the battery pack.

In a sixth aspect of the present invention, there is provided a method of controlling an electronic device on which a battery pack including a memory and a secondary battery is mounted, comprising an output voltage-measuring step of measuring an output voltage from the battery pack, a charged state data-determining step of determining charged state data indicative of a charged state of the battery pack, based on the measured output voltage, and a writing step of writing the determined charged state data in the memory of the battery pack.

In a seventh aspect of the present invention, there is provided a computer-readable program for causing a computer to execute a method of controlling a charging device on which a battery pack including a memory and a secondary battery is mounted, wherein the method comprises a charging current-measuring step of measuring a charging current supplied to the battery pack, a charging voltage-measuring step of measuring a charging voltage applied to the battery pack, a charged state data-determining step of determining charged state data indicative of a charged state of the battery pack, based on at least one of the measured charging current and the measured charging voltage, and a writing step of writing the determined charged state data in the memory of the battery pack.

In an eighth aspect of the present invention, there is provided a computer-readable program for causing a computer to execute a method of controlling an electronic device on which a battery pack including a memory and a secondary battery is mounted, wherein the method comprises an output voltage-measuring step of measuring an output voltage from the battery pack, a charged state data-determining step of determining charged state data indicative of a charged state of the battery pack, based on the measured output voltage, and a writing step of writing the determined charged state data in the memory of the battery pack.

The features and advantages of the invention will become more apparent from the following detailed description taken in conjunction with the accompanying drawings.

BRIEF DESCRIPTION OF THE DRAWINGS

FIG. 2 is a diagram showing various kinds of data and table information stored in a nonvolatile memory within the battery pack.

FIG. 11A is a diagram showing an example of a charge-time charged state data table associated with charged state data 1 under a condition where a charge-time temperature is not lower than 15° C. and lower than 35° C.

FIG. 11B is a diagram showing an example of a charge-time charged state data table associated with the charged state data 1 under a condition where the charge-time temperature is lower than 15° C.

FIG. 11C is a diagram showing an example of a charge-time charged state data table associated with the charged state data 1 under a condition where the charge-time temperature is not lower than 35° C.

FIG. 12 is a diagram showing the FIG. 11A table in more detail so as to explain the relationship between the charged state data 1 and charged state data 2.

FIG. 15 is a diagram showing an example of a left-charged state-induced deterioration table.

FIG. 16 is a diagram showing an example of a charge cycle-induced deterioration table.

FIG. 26A is a diagram showing an example of a discharge-time charged state data table associated with the charged state data 1 under a condition where a discharge-time temperature is not lower than 15° C. and lower than 35° C.

FIG. 26B is a diagram showing an example of a discharge-time charged state data table associated with the charged state data 1 under a condition where the discharge-time temperature is lower than 15° C.

FIG. 26C is a diagram showing an example of a discharge-time charged state data table associated with the charged state data 1 under a condition where the discharge-time temperature is not lower than 35° C.

FIG. 27 is a diagram showing the FIG. 26A table in more detail so as to explain the relationship between the charged state data 1 and charged state data 2.

FIG. 30 is a diagram showing an example of a charge-time temperature characteristic data table.

FIG. 31 is a diagram showing an example of a power consumption data table.

FIG. 32 is a diagram showing an example of an actually usable time coefficient data table.

FIG. 33 is a diagram showing an example of a discharge-time temperature load characteristic data table.

DETAILED DESCRIPTION OF THE PREFERRED EMBODIMENTS

The present invention will now be described in detail with reference to the drawings showing a preferred embodiment thereof.

Figure 1:
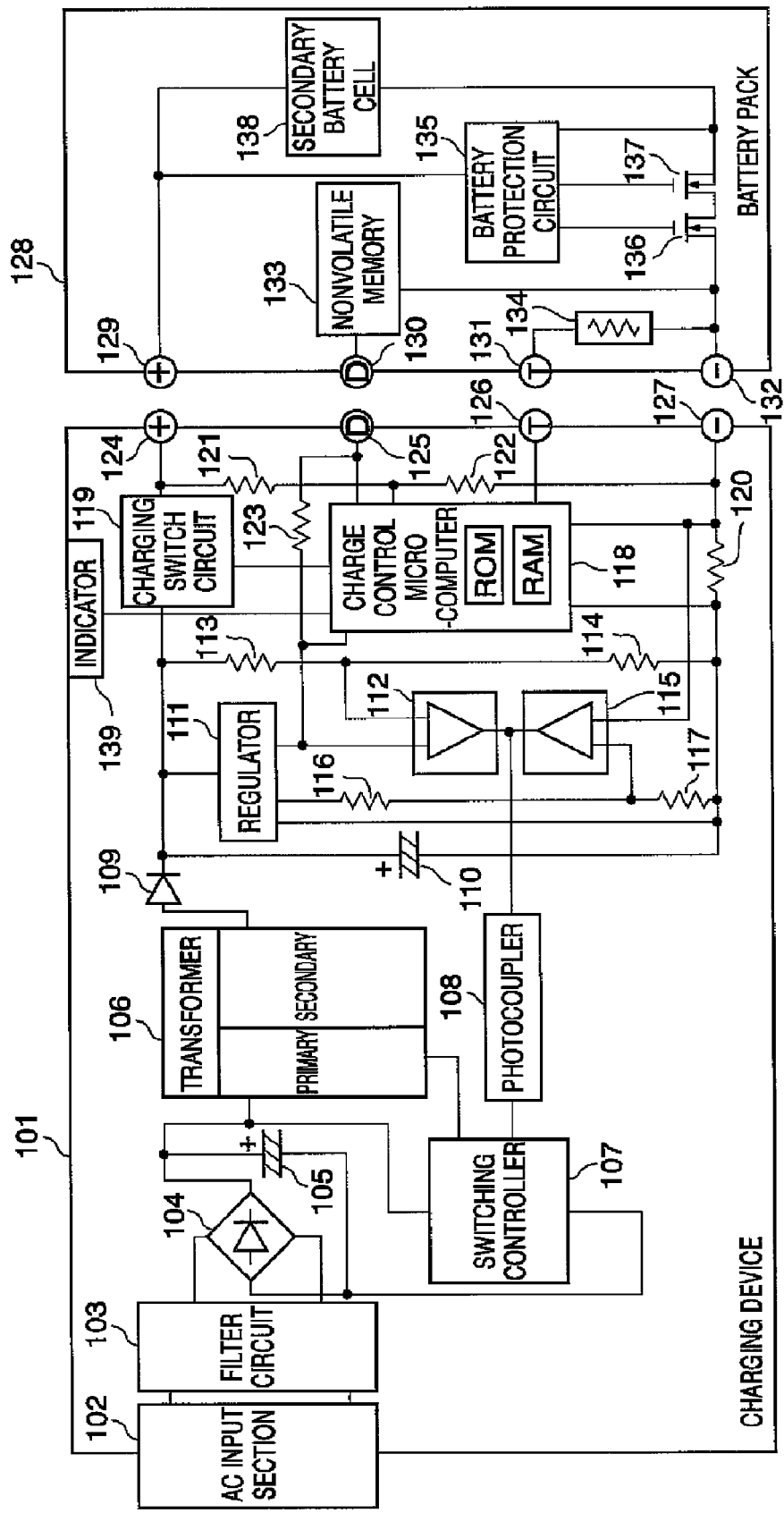
FIG. 1 is a block diagram of the internal configuration of each of a charging device and a battery pack according to an embodiment of the present invention.

FIG. 1 is a block diagram of the internal configuration of each of a charging device and a battery pack according to the embodiment of the present invention.

Referring to FIG. 1, the charging device 101 is used to charge the battery pack 128. The battery pack 128 is attachable to and detachable from the charging device 101, and includes a rechargeable secondary battery. The battery pack 128 is also attachable to and detachable from an electronic device, such as a digital camera or a PDA (Personal Digital Assistant), described hereinafter; and functions as a power supply for the electronic device.

In the charging device 101, an AC input section 102 is connected to an external AC (Alternating Current) power supply to receive AC from the AC power supply. A filter circuit 103 reduces noise contained in the AC input via the AC input section 102. A bridge diode 104 half-wave rectifies the AC. A primary electrolytic capacitor 105 converts the half-wave rectified AC into DC (Direct Current). A transformer 106 transforms the DC. A switching controller 107 stabilizes a secondary-side output of the transformer 106 based on a signal from a photocoupler 108. The photocoupler 108 transfer a signal indicative of the state of a secondary-side charging voltage/charging current to a primary side. A rectifier diode 109 and a rectifier capacitor 110 rectify an output from the transformer 106.

A regulator 111 supplies a predetermined DC power to a charge control microcomputer 118, and at the same time applies a reference voltage to operational amplifiers 112 and 115. The operational amplifier 112 is for feeding back the charging voltage supplied to the battery pack 128. The operational amplifier 115 is provided for feeding back the charging current supplied to the battery pack 128. Resistors 113 and 114 are provided for feeding back the charging voltage supplied to the battery pack 128. Resistors 116 and 117 are provided for setting a predetermined charging current.

The charge control microcomputer 118 is a control circuit including a nonvolatile RAM (Random Access Memory) and a nonvolatile ROM (Read Only Memory). The charge control microcomputer 118 is capable of measuring the charging voltage and the charging current supplied to the battery pack 128, and measuring a temperature within the battery pack 128 using a thermistor 134 provided in the battery pack 128. Further, the charge control microcomputer 118 reads out data and table information shown in FIG. 2 from a nonvolatile memory 133 of the battery pack 128, and determines the charged state of the battery pack 128 based on the read-out data and table information. Furthermore, the charge control microcomputer 118 accesses the nonvolatile memory 133 of the battery pack 128 to write or update various kinds of data.

A charging switch circuit 119 switches on/off a charge output. A current-detecting resistor 120 is provided for enabling the charge control microcomputer 118 to measures the charging current. Resistors 121 and 122 are provided for enabling the charge control microcomputer 118 to measure the charging voltage. A resistor 123 is provided for applying a predetermined voltage to the nonvolatile memory 133. An indicator 139 is comprised of a plurality of LEDs, and the LEDs indicate the charged state of the battery pack 128 by being lit or flashing.

When the battery pack 128 is mounted on the charging device 101, a plus terminal 124 is brought into contact with a plus terminal 129 of the battery pack 128 for electrical connection. When the battery pack 128 is mounted on the charging device 101, a communication (D) terminal 125 is brought into contact with a communication (D) terminal 130 of the battery pack 128 for electrical connection. When the battery pack 128 is mounted on the charging device 101, a temperature (T) terminal 126 is brought into contact with a temperature (T) terminal 131 of the battery pack 128 for electrical connection. When the battery pack 128 is mounted on the charging device 101, a minus terminal 127 is brought into contact with a minus terminal 132 of the battery pack 128 for electrical connection.

The thermistor 134 is a temperature measuring element for converting a change in the temperature into a resistance value. The charge control microcomputer 118 is capable of measuring the temperature of a secondary battery cell 138 using the thermistor 134 via the temperature (T) terminals 126 and 131 connected to each other. A battery protection circuit 135 monitors voltage and current during the charging and discharging of the battery pack 128 to thereby protect the secondary battery cell 138 from being overcharged and overdischarged. A charge protection FET 136 is a switch configured to open the circuit of the battery pack 128 when an abnormality occurs during charging. The charge protection FET 136 is controlled by the battery protection circuit 135. A discharge protection FET 137 is a switch configured to open the circuit of the battery pack 128 when an abnormality occurs during discharging. The discharge protection FET 137 is also controlled by the battery protection circuit 135. The secondary battery cell 138 is implemented e.g. by a lithium ion secondary battery.

When AC is input to the AC input section 102, AC electric power is supplied to the transformer 106 via the filter circuit 103, the bridge diode 104, and the primary electrolytic capacitor 105. The secondary-side output voltage of the transformer 106 is rectified by the rectifier diode 109 and the rectifier capacitor 110 to be set as a charging voltage for the battery pack 128 via the resistors 113 and 114, the operational amplifier 112, and the photocoupler 108.

When the battery pack 128 is mounted on the charging device 101, the plus terminal 124 of the charging device 101 is connected to the plus terminal 129 of the battery pack 128, and the minus terminal 127 of the charging device 101 is connected to the minus terminal 132 of the battery pack 128. At the same time, the communication (D) terminal 125 of the charging device 101 is connected to the communication (D) terminal 130 of the battery pack 128, and the temperature (T) terminal 126 of the charging device 101 is connected to the temperature (T) terminal 131 of the battery pack 128. Further, a charging current is set by the resistors 116 and 117, and constant voltage/constant current charging is performed via the current-detecting resistor 120, the operational amplifier 115, and the photocoupler 108.

The charging of the battery pack 128 is controlled by the charge control microcomputer 118. The charge control microcomputer 118 measures (as a charging current-measuring unit) the charging current based on a potential difference generated across the current-detecting resistor 120, and measures (as a charging voltage-measuring unit) the charging voltage by the resistors 121 and 122. Further, the charge control microcomputer 118 measures an increase in the charging voltage and a decrease in the charging current.

FIG. 2 is a diagram showing various kinds of data and table information stored in the nonvolatile memory 133 of the battery pack 128.

The nonvolatile memory 133 stores, in advance, identification data, charging characteristics data, charged state data 1 and 2, charge count data, full charge capacity data, charge-time temperature data, charge-time temperature characteristic data, charge history data, discharging characteristics data, and a charge cycle-induced deterioration correction table. Further, the nonvolatile memory 133 stores a left-charged state-induced deterioration correction table and a discharge-time temperature load characteristic data table in advance. The identification data, the charging characteristics data, the discharging characteristics data, the charge-time temperature characteristic data, the charge cycle-induced deterioration correction table, and the left-charged state-induced deterioration correction table contain fixed values.

The identification data indicates the type of the battery pack 128. Identification data is set as specific data for each type of battery pack. The charging characteristics data is for generating a charge-time charged state data table, described hereinafter, and contains numerical value data items of charge-time temperature, charging voltage, charging current, full charge capacity ratio, and remaining charge capacity.

The charged state data 1 and the charged state data 2 each indicate the charged state of the battery pack 128. The charge count data stores a count of the number of times of rewriting of the charged state data 1 by incrementing the count whenever the charged state data 1 is rewritten, for managing charge cycles of the battery pack 128. In the present embodiment, twelve-time rewriting of the charged state data 1 or one hundred-time rewriting of the charged state data 2 is defined as one charge cycle.

The full charge capacity data indicates charge capacity, i.e. full charge capacity of the battery pack 128. The charge-time temperature data is information on temperature measured during charging. The charge-time temperature characteristic data is for correcting the full charge capacity according to the charge-time temperature.

The charge history data is a data flag indicative of the charge history of the battery pack 128. The charge history data is set to 1 when the battery pack 128 is charged by the charging device 101, and set to 0 when the battery pack 128 is mounted on the electronic device 301 and is used as a power supply. The discharging characteristics data is for generating a discharge-time charged state data table, described hereinafter, and contains numerical value data items of discharge-time temperature, output voltage, discharge load, full charge capacity ratio, and remaining capacity.

As shown in FIG. 16, the charge cycle-induced deterioration correction table is for correcting the full charge capacity data according to the count of charge cycles. As shown in FIG. 15, the left-charged state-induced deterioration correction table is for correcting the full charge capacity data according to the state of leaving the battery back 128 in a predetermined charged state. The discharge-time temperature load characteristic data table is for correcting power consumption by a temperature during discharging. In the discharge-time temperature load characteristic data table, correction values for correcting the amount of power consumption are defined by the relationship between discharge-time temperature and discharge efficiency, with reference to a discharge efficiency of 1 set for a condition of a 0.5 W discharge at a discharge-time temperature of 25° C., as shown in FIG. 33.

Next, a battery pack-charging process executed by the charging device 101 for charging the battery pack 128 will be described with reference to FIGS. 3 to 17.

Figure 3:
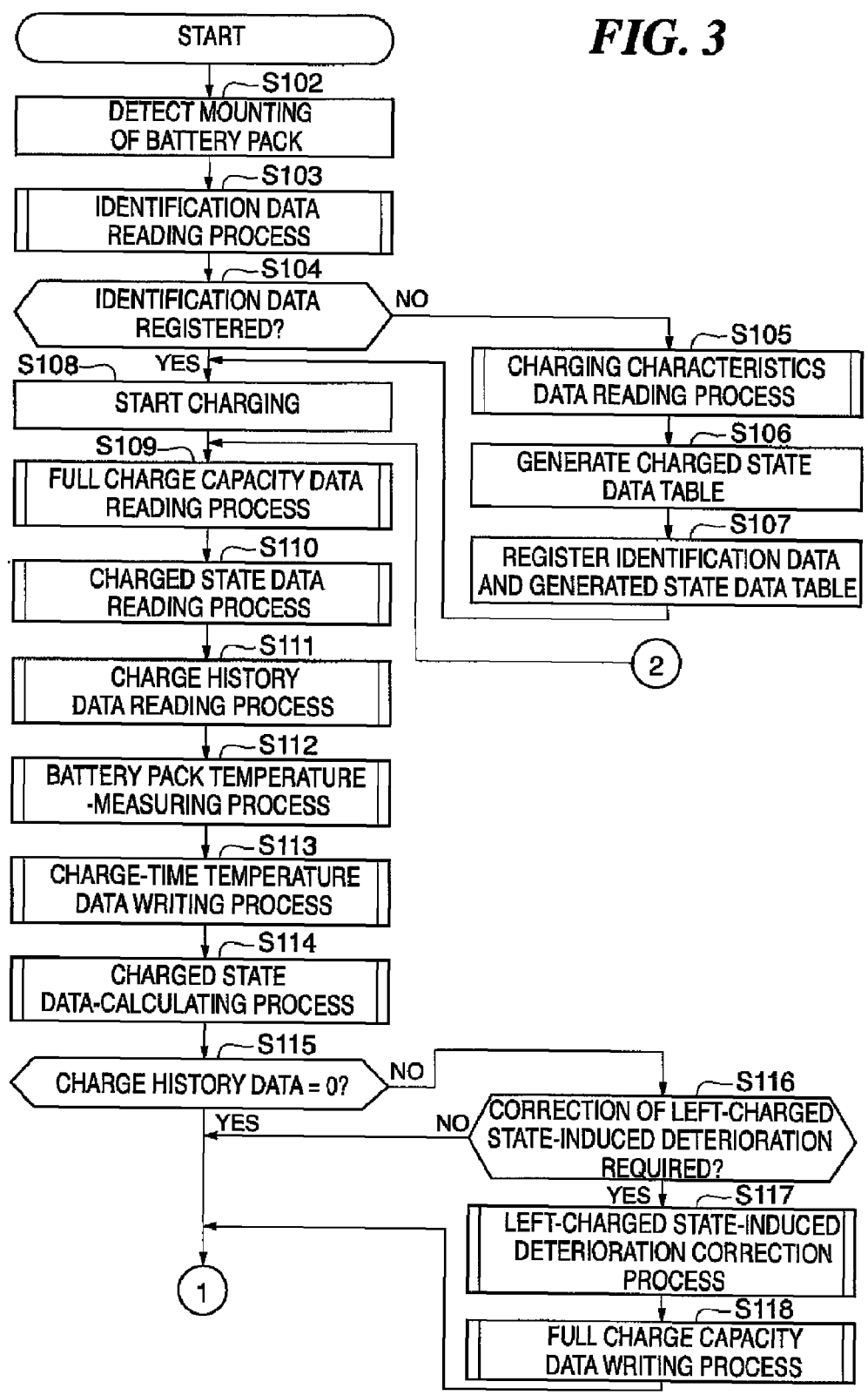
FIG. 3 is a flowchart of a battery pack-charging process executed by the charging device.
Figure 4:
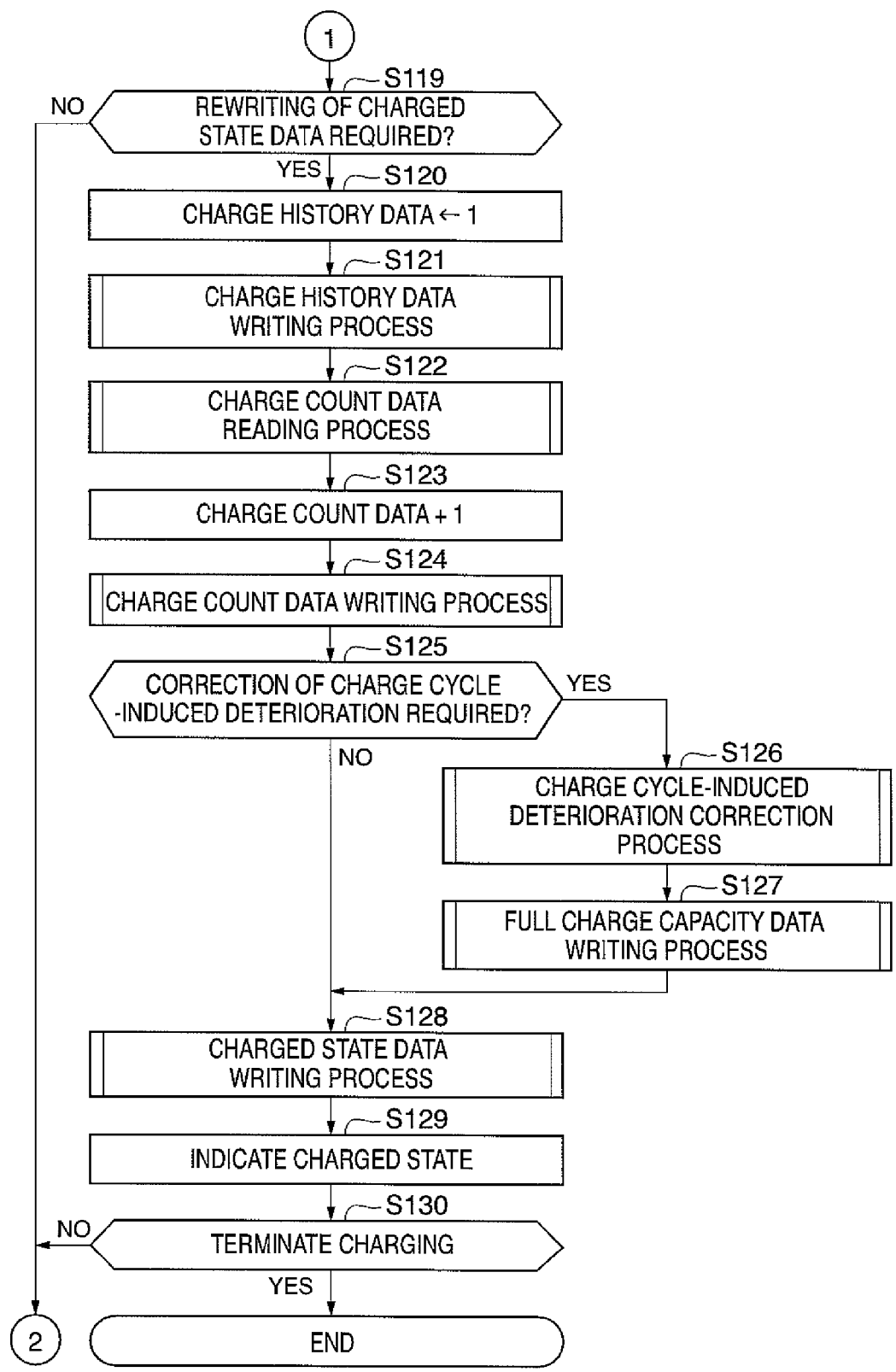
FIG. 4 is a continued part of the charging process shown in FIG. 3.

FIGS. 3 and 4 are a flowchart of the battery pack-charging process executed by the charging device 101 for charging the battery pack 128.

Referring to FIG. 3, the charge control microcomputer 118 detects mounting of the battery pack 128 (step S102), and reads out identification data from the nonvolatile memory 133 of the battery pack 128 via the communication terminals 125 and 130 (step S103). In reading out the identification data from the nonvolatile memory 133, the charge control microcomputer 118 executes a data reading process shown in FIG. 5.

Figure 5:
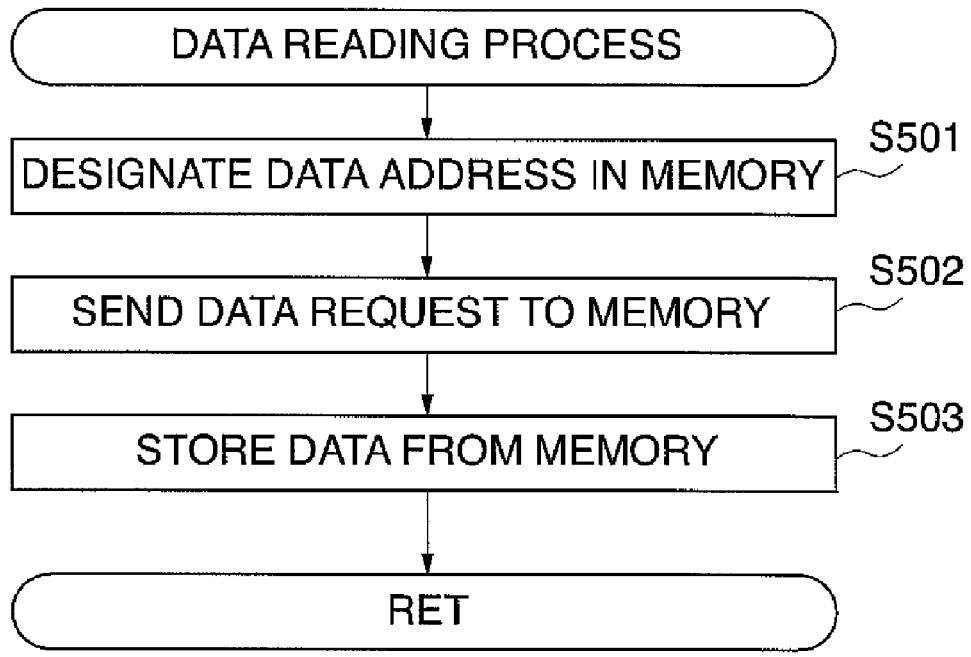
FIG. 5 is a data reading process for reading data from the nonvolatile memory.

Referring to FIG. 5, in a step S501, the charge control microcomputer 118 designates a data address in the nonvolatile memory 133. In the case illustrated in the step S103 in FIG. 3, a data address in the nonvolatile memory 133 where the identification data is stored is designated. Next, in a step S502, a data request is sent to the nonvolatile memory 133. Then, in a step S503, response data received as a response to the sent data request is stored in the RAM in the charge control microcomputer 118, followed by the process returning to the main flow. In the case illustrated in the step S103 in FIG. 3, the identification data is stored as response data in the RAM of the charge control microcomputer 118.

Referring again to FIG. 3, in a step S104, the charge control microcomputer 118 determines whether or not the identification data read out in the step S103 has been stored (registered) in the ROM therein. If the identification data has not been registered in the ROM of the charge control microcomputer 118, the process proceeds to a step S105, whereas if the identification data has been registered in the ROM, the process proceeds to a step S108.

The ROM of the charge control microcomputer 118 stores, in advance, identification data items associated with respective battery pack models and charge-time charged state data tables associated with the respective identification data items. The charge control microcomputer 118 reads out a charge-time charged state data table associated with the identification data read out in the step S103 from the ROM of the charge control microcomputer 118.

On the other hand, if the identification data and the charge-time charged state data table associated with the identification data are not stored in the ROM of the charge control microcomputer 118, the step S105 to a step S107 are executed. This is because when the charging device 101 had been sold before the battery pack became commercial as a new product, the identification data associated with the new battery pack and charge-time charged state data tables associated with the identification data have not been stored yet in the ROM of the charge control microcomputer 118 of the charging device 101.

In the step S105, the charge control microcomputer 118 reads out the charging characteristics data from the nonvolatile memory 133 of the battery pack 128. In reading out the charging characteristics data, the charge control microcomputer 118 executes the data reading process shown in FIG. 5. Then, in the step S106, the charge control microcomputer 118 generates a charge-time charged state data table based on the charging characteristics data read out in the step S105. The charging characteristics data are numerical value data items of the charge-time temperature, the charging voltage, the charging current, and so forth, as shown in FIG. 11A. The charge control microcomputer 118 generates the charge-time charged state data table by applying the numerical values read out as the charging characteristics data to an empty data table.

Next, in the step S107, the charge control microcomputer 118 registers (stores) the identification data read out in the step S103 and the charge-time charged state data table generated in the step S106 in the RAM in a state associated with each other, followed by the process proceeding to the step S108.

It should be noted that in stead of registering the charge-time charged state data tables in advance in the ROM of the charge control microcomputer 118, the charge control microcomputer 118 may be configured to read out charging characteristics data from the nonvolatile memory 133 of the battery pack 128 and generates a charge-time charged state data table based on the charging characteristics data. In this method, a charge-time charged state data table is generated whenever the present battery pack-charging process is started, so that the charge control microcomputer 118 can dispense with the nonvolatile RAM.

Now, a description will be given of the charge-time charged state data table.

Figure 13A:
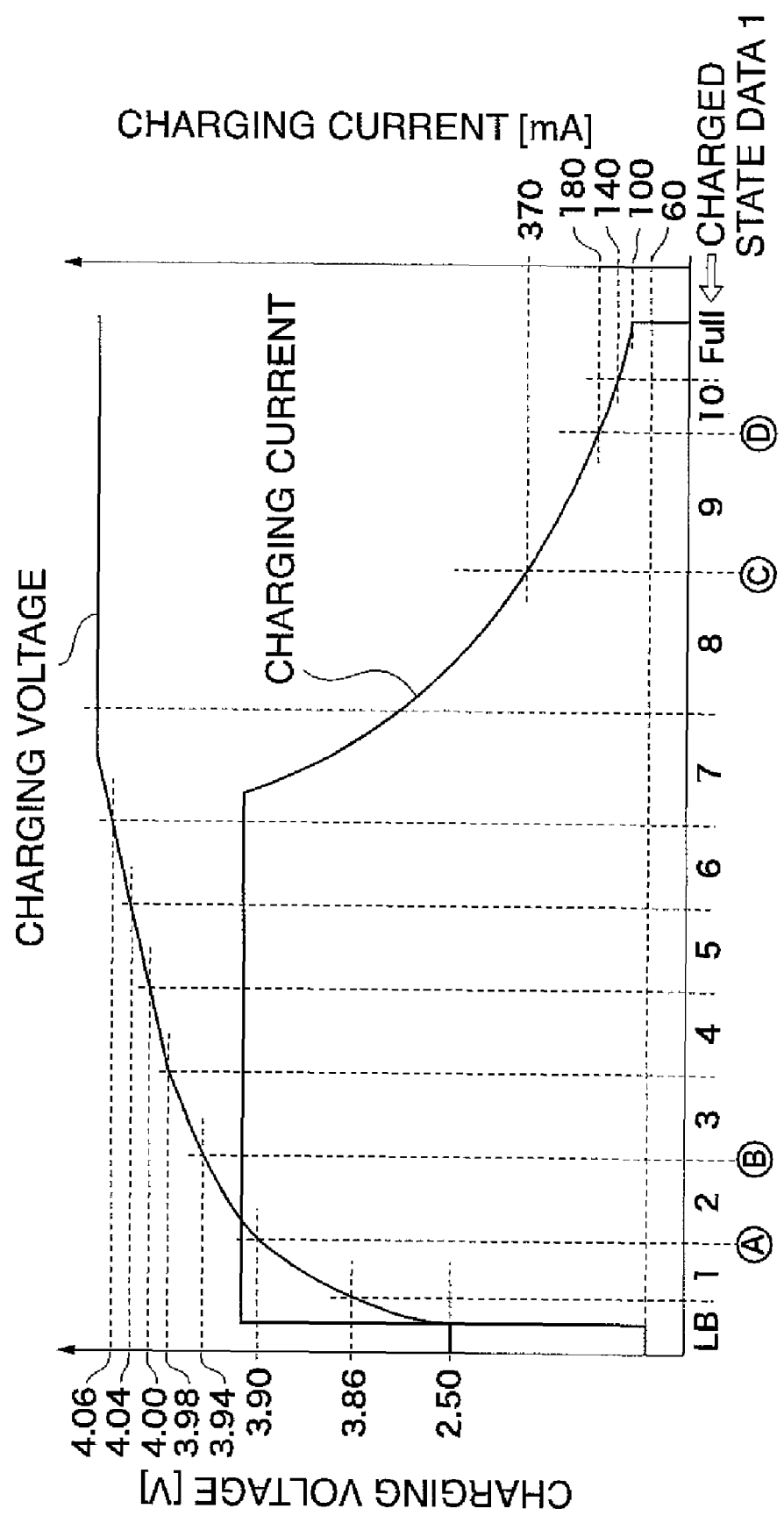
FIGS. 13A to 13C are diagrams useful in explaining the relationship between the charging characteristics of the battery pack and the charged state data 1 and 2.
Figure 13B:
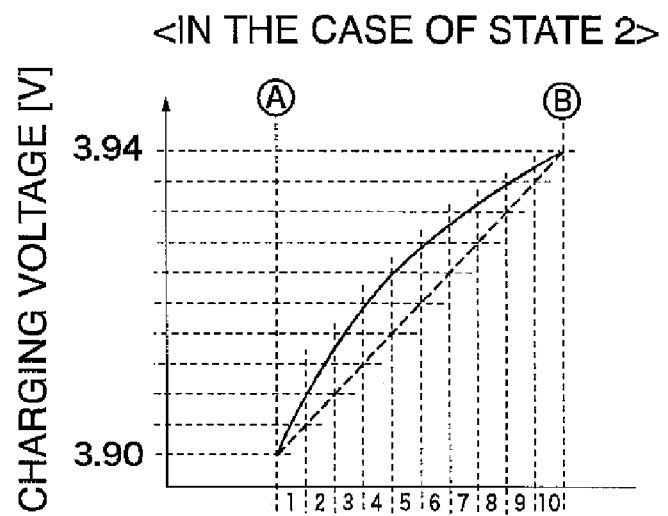
Figure 13C:
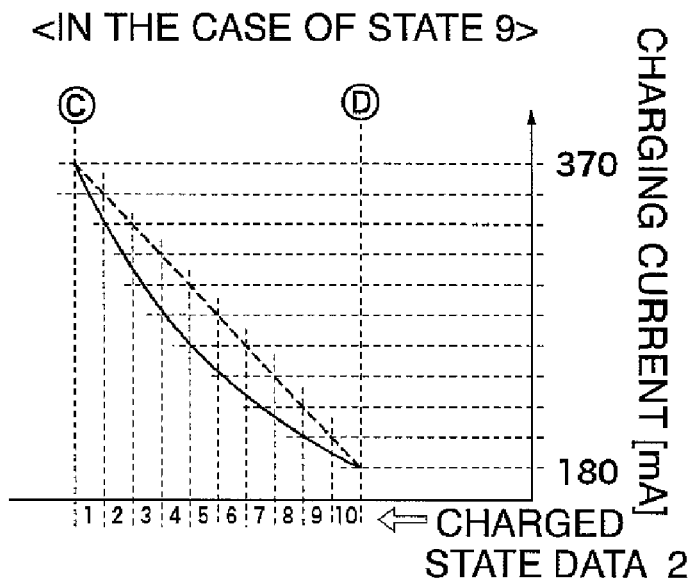
Figure 14:
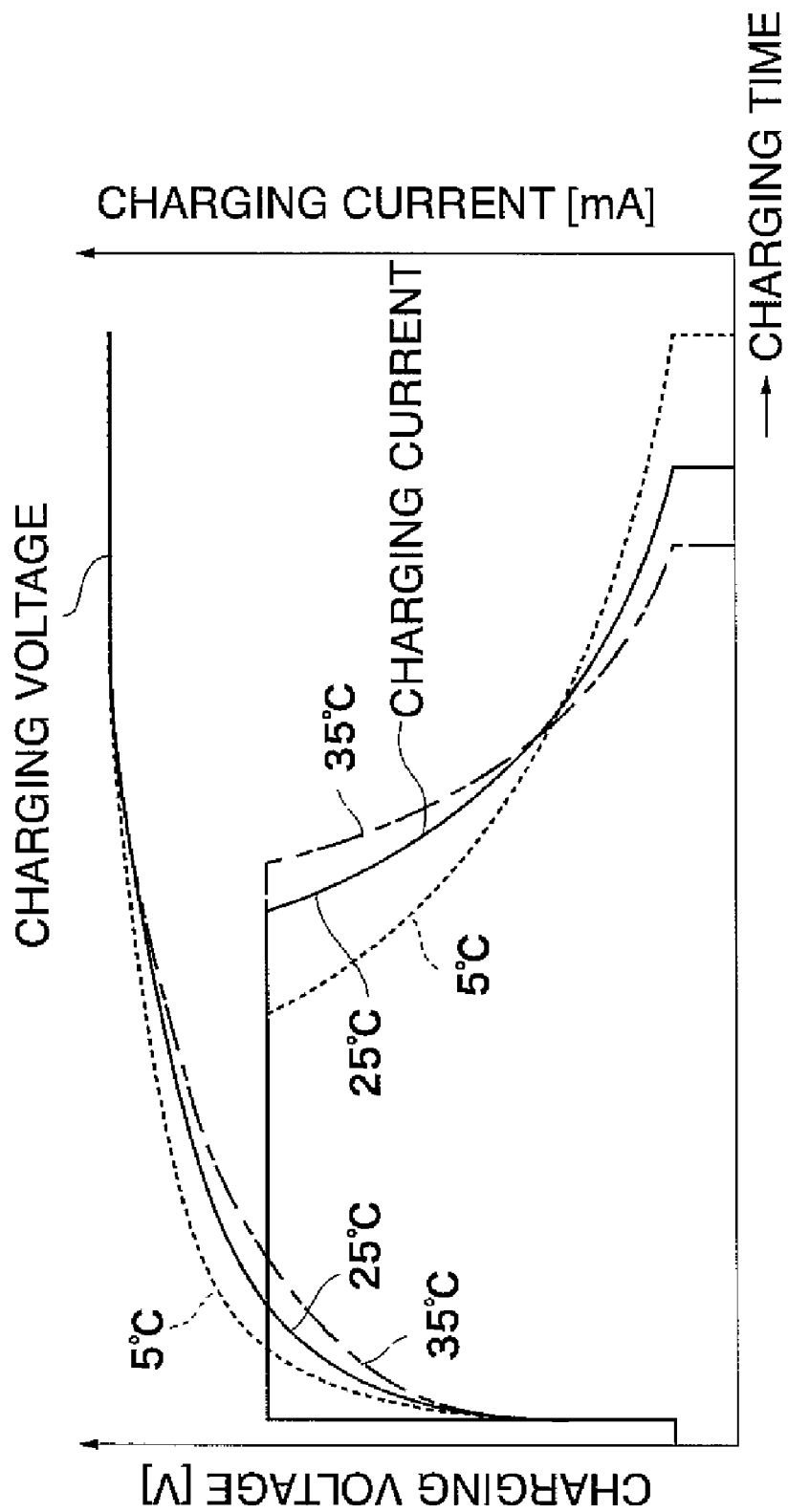
FIG. 14 is a diagram useful in explaining changes in the charging characteristics due to changes in the temperature.

FIGS. 11A to 11C are diagrams each showing an example of the charge-time charged state data table (full charge capacity: 700 mAh), and FIG. 12 is a diagram showing FIG. 11A in more detail. FIGS. 13A to 13C are diagrams useful in explaining the relationship between the charging characteristics of the battery pack 128 and the charged state data 1 and 2. FIGS. 13A to 13C show charging characteristics represented by charging current curves and charging voltage curves obtained when the charge-time temperature is 25° C. FIG. 14 is a diagram showing changes in the charging characteristics caused by changes in the temperature.

The charge-time charged state data table is formed by associating the charged state data 1 and 2 indicative of the charged state of the battery pack 128 and charging characteristics data with each other.

The charge-time charged state data tables shown in FIGS. 11A to 11C are set as different tables according to the charge-time temperature range. Specifically, when the charge-time temperature is lower than 15° C., the charge-time charged state data table shown in FIG. 11B is used. When the charge-time temperature is not lower than 15° C. and lower than 35° C., the charge-time charged state data table shown in FIG. 11A is used. Further, when the charge-time temperature is not lower than 35° C., the charge-time charged state data table shown in FIG. 11C is used. This is because the charging voltage and charging current of the battery pack 128 change according to the charge-time temperature as shown in FIG. 14. More specifically, in general, when the charge-time temperature is low (e.g. 5° C.), the charging voltage starts up more quickly, the charging current starts to decrease earlier, and it takes longer time to charge the battery pack 128 to its fully charged state than when it is normal temperature (e.g. 25° C.). On the other hand, when the charge-time temperature is high (e.g. 35° C.), the charging voltage starts up more gently, the charging current starts to decrease later, and it takes shorter time to charge the battery pack 128 to its fully charged state than when it is normal temperature.

The charge-time charged state data table in FIG. 12 shows FIG. 11A in more detail so as to explain the relationship between the charged state data 1 and the charged state data 2. The charge-time charged state data table in FIG. 12 defines the charged state data 1 in which the charged state of the battery pack 128 is divided into twelve levels: LB (Low Battery) as discharged state, States 1 to 10, and Full. The ranges of the charged state data 1 from LB to the State 8 are set based on the charging voltage of the charging characteristics. On the other hand, the ranges of State 9 to Full are set based on the charging current of the charging characteristics. This is because the charging voltage shows no change when it approaches full charge, which makes it difficult to correctly show the charged state of the battery pack 128 in ranges close to the full charge, whereas the charging current which is held constant before the full charge is approached shows changes in the ranges close to the full charge. Thus, in the respective ranges of LB to State 8, where the charging voltage changes, the charged state is determined based on the charging voltage, and in the respective ranges of State 9 to Full, where the charging current changes, the charged state is determined based on the charging current.

Further, in the charge-time charged state data table, as shown in FIG. 12, the levels of the charged state data 1 are each sub-divided into a plurality of levels, and the sub-divided levels are defined as the charged state data 2. In the charged state data 2, each of States 2 to 9 of the charged state data 1 is divided into ten levels, and a combined range of State 1 and LB is divided into ten levels. Further, a combined range of State 10 and Full of the charged state data 1 is divided into ten levels. Thus, the charged state data 1 and 2 can represent the charged state of the battery pack 128 by one hundred levels, and therefore the charged state of the battery pack 128 is managed in units of per one-percent changes in state.

In the ranges of the charged state data 1 from LB to State 8, which are set as based on the charging voltage, the corresponding ranges of the charged state data 2 are also set based on the charging voltage as shown in FIGS. 13A to 13C. Further, in the ranges of the charged state data 1 from State 9 to Full, which are set based on the charging current, the corresponding ranges of the charged state data 2 are also set as based on the charging current.

Referring again to FIG. 3, in the step S108, the charge control microcomputer 118 starts charging. Next, in a step S109, the full charge capacity data is read out from the nonvolatile memory 133 of the battery pack 128. Then, in a step S110, the charged state data 1 and 2 are read out from the nonvolatile memory 133, and in a step S111, the charge history data is read out from the nonvolatile memory 133. In reading out data in each of the steps S109 to S111, the charge control microcomputer 118 executes the data reading process shown in FIG. 5. The data read out are stored in the RAM of the charge control microcomputer 118.

Then, in a step S112, the charge control microcomputer 118 measures the temperature of the battery pack 128 by the thermistor 134 within the battery pack 128 (battery pack temperature-measuring process).

Figure 7:
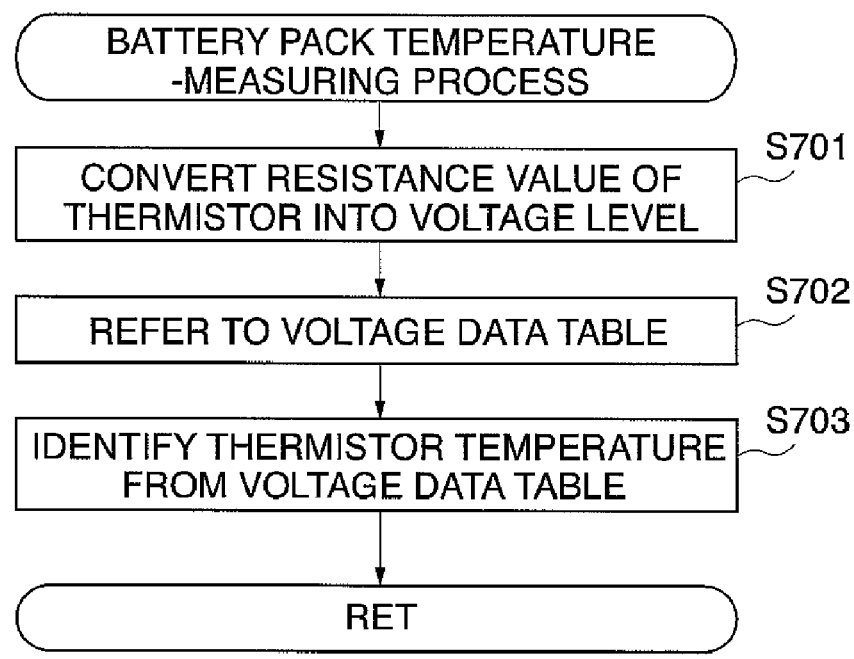
FIG. 7 is a flowchart showing details of a battery pack temperature-measuring process executed in a step S112 in FIG. 3.

FIG. 7 is a flowchart showing details of the battery pack temperature-measuring process executed in the step S112 in FIG. 3.

Referring to FIG. 7, in a step S701, the charge control microcomputer 118 applies a predetermined voltage to the thermistor 134 via a resistor (not shown) to convert the resistance value of the thermistor 134 into a voltage level. Then, in a step S702, the charge control microcomputer 118 refers to a preset voltage data table (not shown) according to the voltage level obtained by the conversion in the step S701. The voltage data table is stored in the ROM of the charge control microcomputer 118. The voltage data table is configured based on the relationship between the temperature and the resistance value of the thermistor 134, for use in estimating a temperature from a voltage level.

In a step S703, the charge control microcomputer 118 identifies a thermistor temperature corresponding to the voltage level obtained by the conversion in the step S701, in the voltage data table referred to in the step S702, following by the process returning to the main flow.

Referring again to FIG. 3, in a step S113, the charge control microcomputer 118 writes the battery pack temperature measured in the step S112, as a charge-time temperature data item, in the nonvolatile memory 133 of the battery pack 128 to update the charge-time temperature data. In writing the charge-time temperature data item, the charge control microcomputer 118 executes a data writing process shown in FIG. 6.

Figure 6:
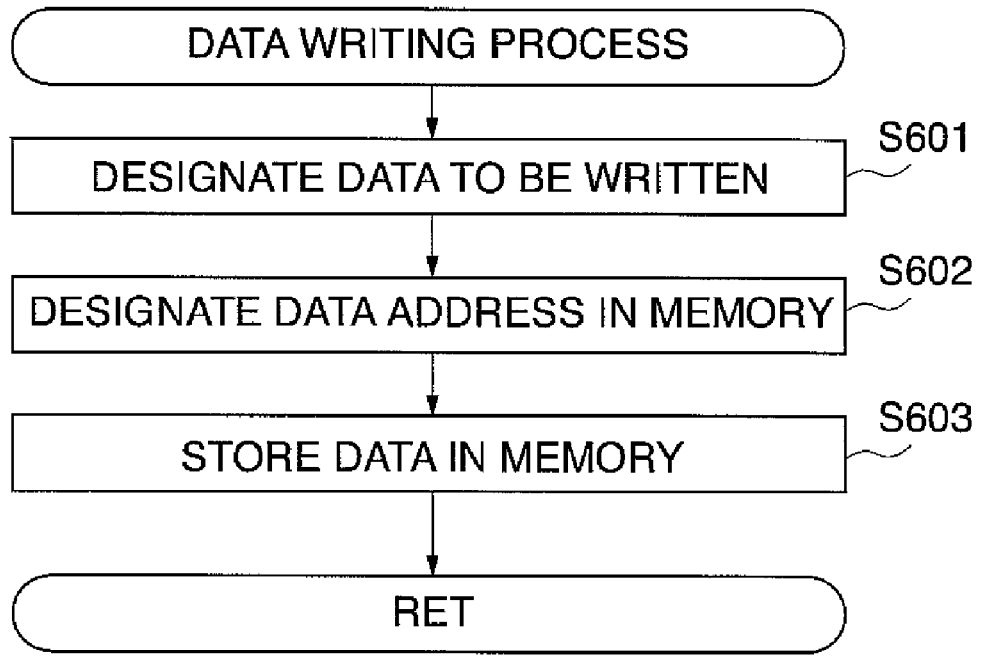
FIG. 6 is a flowchart of a data writing process for writing data into the nonvolatile memory.

Referring to FIG. 6, in a step S601, the charge control microcomputer 118 designates a data item to be written in the nonvolatile memory 133 of the battery pack 128. The data item designated in the step S113 in FIG. 3 is charge-time temperature data. Then, in a step S602, a data address in the nonvolatile memory 133 is designated. The data address designated in the step S113 in FIG. 3 is that of the charge-time temperature data. Then, in a step S603, the charge control microcomputer 118 writes the data item (charge-time temperature data in the present example) in the predetermined address in the nonvolatile memory 133 of the battery pack 128, followed by returning to the main flow.

Referring again to FIG. 3, in a step S114, the charge control microcomputer 118 executes a charged state data-calculating process.

Figure 8:
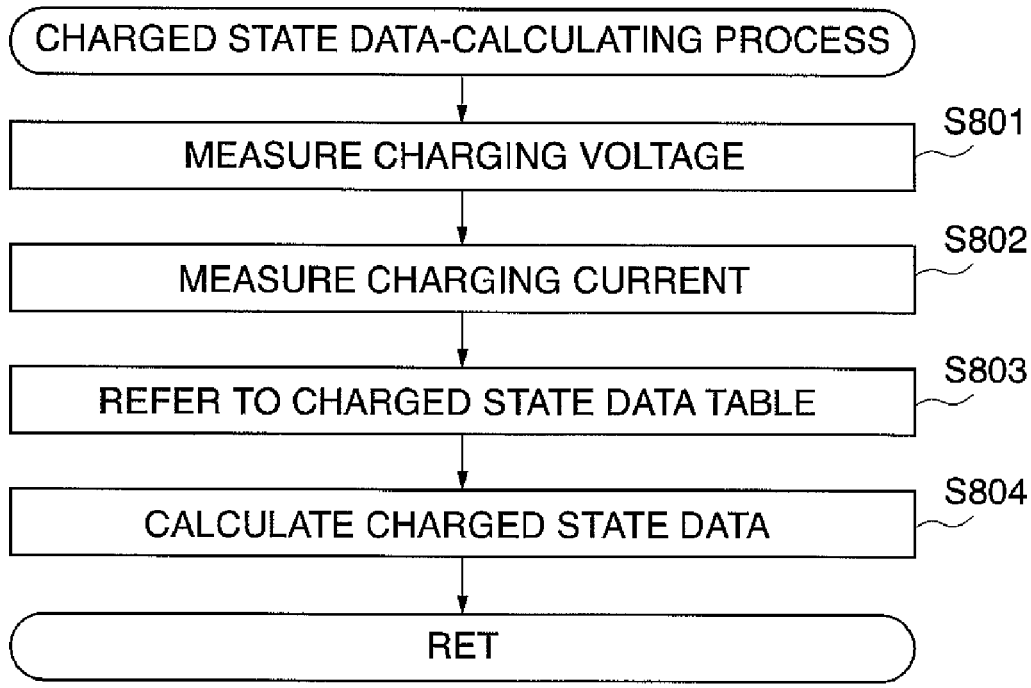
FIG. 8 is a flowchart showing details of a charged state data-calculating process executed in a step S114 in FIG. 3.

FIG. 8 is a flowchart showing details of the charged state data-calculating process executed in the step S114 in FIG. 3.

Referring to FIG. 8, in a step S801, the charge control microcomputer 118 measures the charging voltage supplied to the battery pack 128, via the resistors 121 and 122. Then, in a step S802, the charge control microcomputer 118 measures the charging current supplied to the battery pack 128, based on a potential difference generated across the current-detecting resistor 120.

Next, in a step S803, the charge control microcomputer 118 selects a charge-time charged state data table corresponding to the temperature measured in the step S112 from the charge-time charged state data tables associated with the identification data read out in the step S103, and refers to the selected charge-time charged state data table. The charge-time charged state data table is one stored in the ROM of the charge control microcomputer 118 or one generated through the steps S105 to S107. Then, in a step S804, the charge control microcomputer 118 calculates the charged state data 1 and 2 from the charge-time charged state data table referred to in the step S803, based on the charging voltage measured in the step S801 and the charging current measured in the step S802, followed by returning to the main flow.

When a battery pack with a charge-time temperature of 25° C. and a full charge capacity of 700 mAh is employed, the charge-time charged state data table shown in FIG. 11A and FIG. 12 showing FIG. 11A in more detail is used. For example, when a charging voltage Vb is 3.930 [V], it is understood by referring to FIG. 11A that the charged state data 1 indicates a level of State 2. Further, it is understood by referring to more detailed FIG. 12 that the charged state data 2 indicates a level of 8 in which the full charge capacity ratio is 18% and the charge capacity is 126 mAh.

Referring again to FIG. 3, in steps S115 to S118, a sequence of processing operations are carried out for reflecting in the full charge capacity data the deterioration of the full charge capacity that occurs when the battery pack is left unused in a fully charged state. When a lithium-ion secondary battery or the like battery is left unused in the fully charged state, the rechargeable capacity thereof decreases even in a state where the battery is not used in an electronic device. This decrease in the charge capacity is referred to as "left-charged state-induced deterioration".

In the step S115, the charge control microcomputer 118 determines whether or not the charge history data read out in the step S111 is 0. If the charge history data is 0, i.e. if the battery pack 128 has been used as a power supply, the process proceeds to a step S119 in FIG. 4. On the other hand, if the charge history data is 1, i.e. if the battery pack 128 was charged by the charging device 101, the process proceeds to the step S116.

Then, in the step S116, the charge control microcomputer 118 makes a comparison between the charged state data 1 read out in the step S110 and the charged state data 1 calculated in the step S114, to thereby determine whether or not correction of left-charged state-induced deterioration is required. If the charged state data 1 read out in the step S110 and the charged state data 1 calculated in the step S114 match each other, the charge control microcomputer 118 judges that correction of left-charged state-induced deterioration is not required, and the process proceeds to the step S119 in FIG. 4. On the other hand, if the charged state data 1 read out in the step S110 and the charged state data 1 calculated in the step S114 do not match each other, the charge control microcomputer 118 judges that correction of left-charged state-induced deterioration is required, and the process proceeds to the step S117, wherein a left-charged state-induced deterioration correction process is executed.

Figure 9:
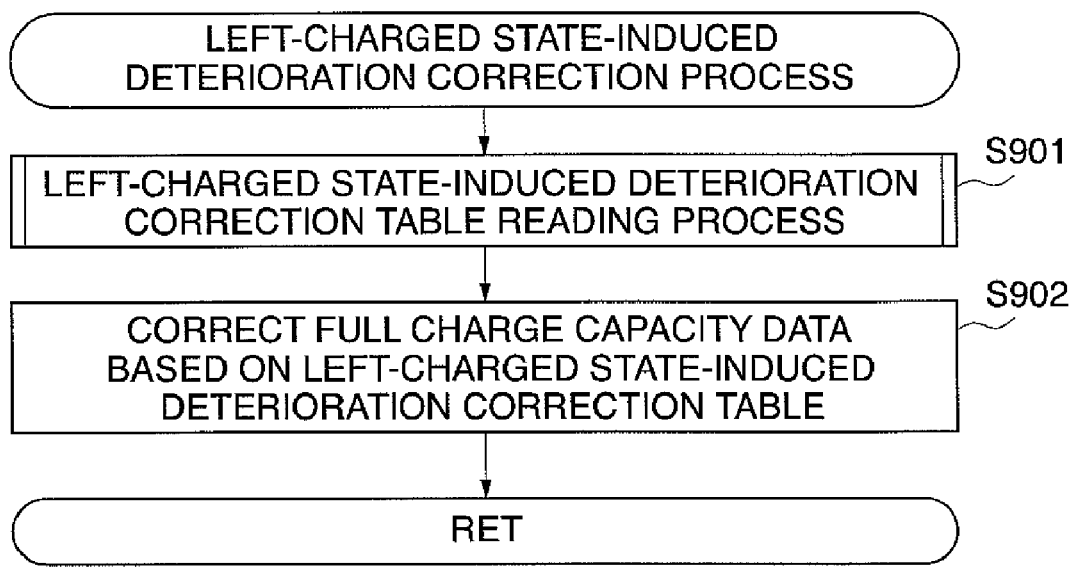
FIG. 9 is a flowchart showing details of a left-charged state-induced deterioration correction process executed in a step S117 in FIG. 3.

FIG. 9 is a flowchart showing details of the left-charged state-induced deterioration correction process executed in the step S117 in FIG. 3.

Referring to FIG. 9, in a step S901, the charge control microcomputer 118 reads out the left-charged state-induced deterioration correction table from the nonvolatile memory 133 of the battery pack 128. In reading out the left-charged state-induced deterioration correction table, the charge control microcomputer 118 executes the data reading process shown in FIG. 5.

Then, in a step S902, the charge control microcomputer 118 corrects the full charge capacity data based on the read-out left-charged state-induced deterioration correction table. In the present case, the charge control microcomputer 118 identifies a left-charged state-induced deterioration correction value corresponding to the charged state data calculated in the step S114, from the left-charged state-induced deterioration correction table, and subtracts the left-charged state-induced deterioration correction value from the full charge capacity data. FIG. 15 shows an example of the left-charged state-induced deterioration correction table.

Referring to FIG. 15, it is understood from the left-charged state-induced deterioration correction table that when the charged state data 1 stored in the nonvolatile memory 133 indicates a level of Full, the amount of deterioration is larger than when the same indicates a level of State 10. This is because in a lithium-ion secondary battery, the degree of deterioration due to the left-unused state becomes larger as the battery is in a state closer to the full charge.

The left-charged state-induced deterioration correction table stores a left-charged state-induced deterioration correction value corresponding to the charged state data 1 stored in the nonvolatile memory 133 of the battery pack 128 and the charged state data 1 calculated in the step S114. In FIG. 15, for example, when the charged state data 1 stored in the nonvolatile memory 133 indicates a level of Full and the charged state data 1 calculated in the step S114 indicates a level of Full or State 10, it is judged that left-charged state-induced deterioration has not occurred, and the left-charged state-induced deterioration correction value is 0. As a consequence, in the step S902 in FIG. 9, the value of the full charge capacity data is not unchanged. On the other hand, when the charged state data 1 stored in the nonvolatile memory 133 indicates a level of Full and the charged state data 1 calculated in the step S114 indicates a level of State 9, the left-charged state-induced deterioration correction value is 1. As a consequence, the full charge capacity deteriorates by 1 mAh, and therefore in the step S902, 1 mAh is subtracted from the value of the full charge capacity data. Similarly, when the charged state data 1 stored in the nonvolatile memory 133 indicates a level of Full and the charged state data 1 calculated in the step S114 indicates a level of State 8, 2 mAh is subtracted from the value of the full charge capacity data in the step S902.

Referring again to FIG. 3, in the step S118, the charge control microcomputer 118 rewrites the full charge capacity data stored in the nonvolatile memory 133 of the battery pack 128 by replacing the same with the full charge capacity data corrected in the step S117, followed by the process proceeding to the step S119 in FIG. 4. In writing the full charge capacity data in the nonvolatile memory 133 in the step S118, the charge control microcomputer 118 executes the data writing process shown in FIG. 6. The execution of the sequence of processing in the steps S115 to S118 makes it possible to correct deterioration of the secondary battery which occurs when the battery is left unused in a fully charged state, and more accurately display a remaining capacity. It should be noted that even when the full charge capacity data is rewritten, the charge count data is not rewritten.

In the step S119 in FIG. 4, the charge control microcomputer 118 determines whether or not it is required to rewrite the charged state data stored in the nonvolatile memory 133 of the battery pack 128. In this step, it is determined whether or not the charged state data calculated in the step S114 exceeds the charged state data read out from the nonvolatile memory 133. If the charged state data calculated in the step S114 does not exceed the charged state data read out from the nonvolatile memory 133, it is determined that data rewriting is not required, and the process returns to the step S109 in FIG. 3. On the other hand, if the charged state data calculated in the step S114 exceeds the charged state data read out from the nonvolatile memory 133, the process proceeds to a step S120.

In the step S120, the charge control microcomputer 118 sets the charge history data read into the RAM therein to 1. Then, in a step S121, the charge control microcomputer 118 writes 1 in the data address of the charge history data stored in the nonvolatile memory 133 of the battery pack 128. In writing the charge history data, the charge control microcomputer 118 executes the data writing process shown in FIG. 6.

In steps S122 to S127, a sequence of processing operations are carried out for reflecting in the full charge capacity data the deterioration of the full charge capacity of the battery pack 128 due to repetition of charging and discharging. In general, in a secondary battery, repetition of charging and discharging causes reduction of rechargeable capacity. This reduction of the charge capacity is referred to as "charge cycle-induced deterioration". In the present embodiment, the amount of deterioration of the full charge capacity corresponding to one cycle of charging and discharging for the battery pack 128 is reflected in the full charge capacity data.

In the step S122, the charge control microcomputer 118 reads out the charge count data from the nonvolatile memory 133 of the battery pack 128. In reading out the charge count data, the charge control microcomputer 118 executes the data reading process shown in FIG. 5. Next, in the step S123, the charge count data read out in the step S122 is incremented by 1. Then, in the step S124, the charge count data incremented by 1 is written in the nonvolatile memory 133 of the battery pack 128 so as to update the charge count data stored in the nonvolatile memory 133, followed by the process proceeding to the step S125. In writing the charge count data in the nonvolatile memory 133, the charge control microcomputer 118 executes the data writing process shown in FIG. 6.

In the step S125, the charge control microcomputer 118 counts the number of times of rewriting of the charge state data by the charge count data to thereby determine whether or not charging corresponding to one cycle has been performed. For example, when the charge count data represents a count of ten, it is determined that charging corresponding one cycle has been performed. If it is determined in the step S125 that the count of charge cycles is less than one, the charge control microcomputer 118 judges that correction of charge cycle-induced deterioration is not required, and the process proceeds to a step S128. On the other hand, if the count of charge cycles is more than one, the charge control microcomputer 118 judges that correction of charge cycle-induced deterioration is required, and executes a charge cycle-induced deterioration correction process (step S126). The execution of the sequence of processing operations in the steps S122 to S127 makes it possible to correct deterioration of the secondary battery dependent on the count of charge cycles, and more accurately display a remaining battery charge.

FIG. 16 shows an example of the charge cycle-induced deterioration correction table stored in the nonvolatile memory 133 of the battery pack 128.

As shown in FIG. 16, in the charge cycle-induced deterioration correction table, when the count of charge cycles is within a range of 1 to 50, a charge cycle-induced deterioration correction value (i.e. the amount of deterioration of the full charge capacity) per charge cycle is set to 0.42 mAh. When the count of charge cycles is within a range of 51 to 100, the charge cycle-induced deterioration correction value is set to 0.7 mAh. Further, when the count of charge cycles is within a range of 101 to 150, the charge cycle-induced deterioration correction value is set to 0.98 mAh.

Figure 10:
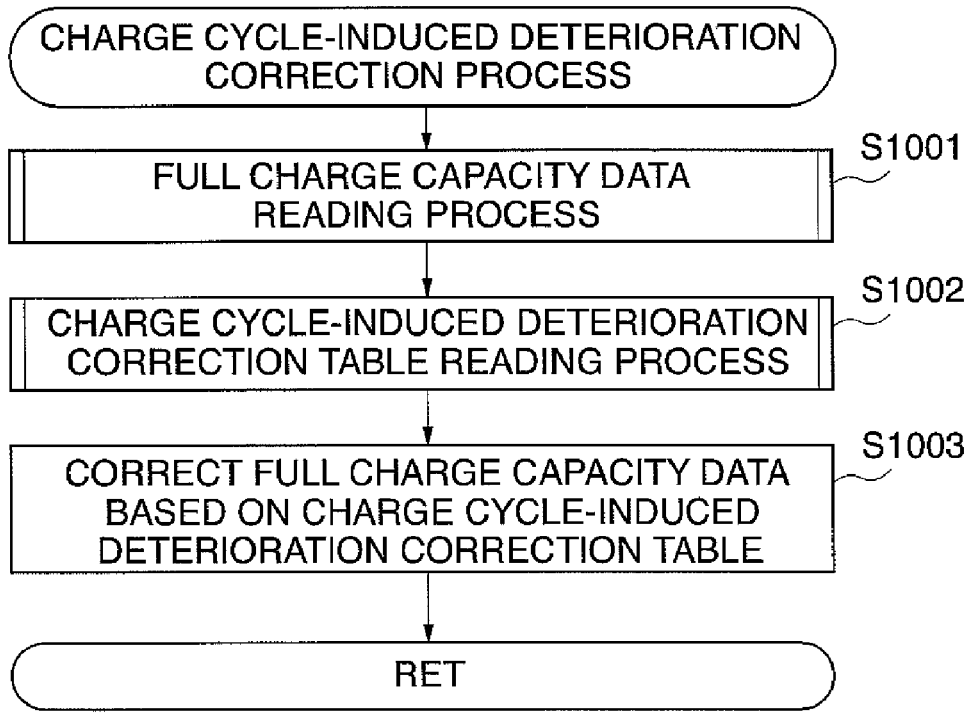
FIG. 10 is a flowchart showing details of a charge cycle-induced deterioration correction process executed in a step S126 in FIG. 4.

FIG. 10 is a flowchart showing details of the charge cycle-induced deterioration correction process executed in the step S126 in FIG. 4.

Referring to FIG. 10, the charge control microcomputer 118 reads out the full charge capacity data and the charge cycle-induced deterioration correction table from the nonvolatile memory 133 of the battery pack 128 (steps S1001 and S1002). In reading out the data, the charge control microcomputer 118 executes the data reading process shown in FIG. 5.

Then, in a step S1003, the charge control microcomputer 118 corrects the full charge capacity data based on the read-out charge cycle-induced deterioration correction table. In this case, the charge control microcomputer 118 identifies a charge cycle-induced deterioration correction value corresponding to the count of charge cycles determined from the charge count data, from the charge cycle-induced deterioration correction table, and subtracts the charge cycle-induced deterioration correction value from the full charge capacity data. For example, when the count of charge cycles is within the range of 1 to 50, a value of 0.42 mAh is subtracted from the value of the full charge capacity data per one charge cycle. Although in the present embodiment, a description is given of a method of performing the charge cycle-induced deterioration correction by subtracting a fixed correction value from the value of the full charge capacity data, a method may be employed in which a charge cycle-induced deterioration characteristic curb is reproduced using an approximate expression, to thereby determine the amount of charge cycle-induced deterioration.

Referring again to FIG. 4, in the step S127, the charge control microcomputer 118 rewrites the full charge capacity data stored in the nonvolatile memory 133 of the battery pack 128 by replacing the same with the full charge capacity data corrected in the step S126, followed by the process proceeding to the step S128. In writing the full charge capacity data in the nonvolatile-memory 133 in the step S126, the charge control microcomputer 118 executes the data writing process shown in FIG. 6. The execution of the sequence of processing operations in the steps S122 to S127 makes it possible to correct deterioration of the secondary battery dependent on the count of charge cycles, and more accurately display a remaining capacity.

In the step S128, the charge control microcomputer 118 writes the charged state data 1 and 2 calculated in the step S114 in data addresses of the charged state data 1 and 2 in the nonvolatile memory 133 of the battery pack 128. In writing the charged state data in the nonvolatile memory 133, the charge control microcomputer 118 executes the data writing process shown in FIG. 6.

Then, in a step S129, the charge control microcomputer 118 performs control such that the charged state of the battery pack 128 is indicated on the indicator 139 of the charging device 101, based on the current charged state data 1 and 2 calculated in the step S114.

Figure 17:
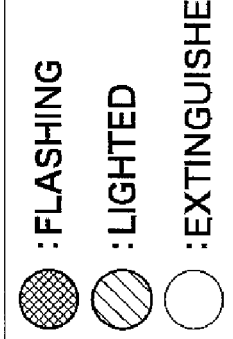
FIG. 17 is a view showing examples of indication of charged state on an indicator of the charging device.

FIG. 17 is a view showing examples of indication of the charged state on the indicator 139 of the charging device 101.

Referring to FIG. 17, when the indicator 139 is comprised of five LEDs, indications are given as illustrated in LED indication 1. When the indicator 139 is comprised of three LEDs, indications are given as illustrated in LED indication 2.

In the example of indications illustrated in the LED indication 1, the charged state from LB to State 2 is indicated by illumination of an LED 1 alone. The charged state from State 3 to State 4 is indicated by illumination of the LED 1 and an LED 2. The charged state from State 5 to State 6 is indicated by illumination of the LEDs 1 to 3. The charged state from State 7 to State 8 is indicated by illumination of the LEDS 1 to 4. The charged state from State 9 to Full is indicated by illumination of the LEDS 1 to 5.

In the example of indications illustrated in the LED indication 2, the charged state from LB to State 2 is indicated by illumination of the LED 1 alone. The charged state from State 3 to State 4 is indicated by flashing of the LED 1. The charged state from State 5 to State 6 is indicated by illumination of the LED 1 and flashing of the LED 2. The charged state from State 7 to State 8 is indicated by illumination of the LEDs 1 and 2, and flashing of the LED 3. The charged state from State 9 to Full is indicated by illumination of all the LEDS 1 to 3. It is possible to indicate the charged state more finely by an increased combinations of illumination and flashing of the LEDs.

Referring again to FIG. 4, in a step S130, the charge control microcomputer 118 determines whether to terminate charging, based on whether or not the charging voltage and the charging current satisfy charging completion conditions. If the charging voltage and the charging current do not satisfy the charging completion conditions, the process returns to the step S109 to continue charging, whereas if the charging voltage and the charging current satisfy the charging completion conditions, charging is terminated.

Next, a description will be given of the electronic device according to the present embodiment.

Figure 18:
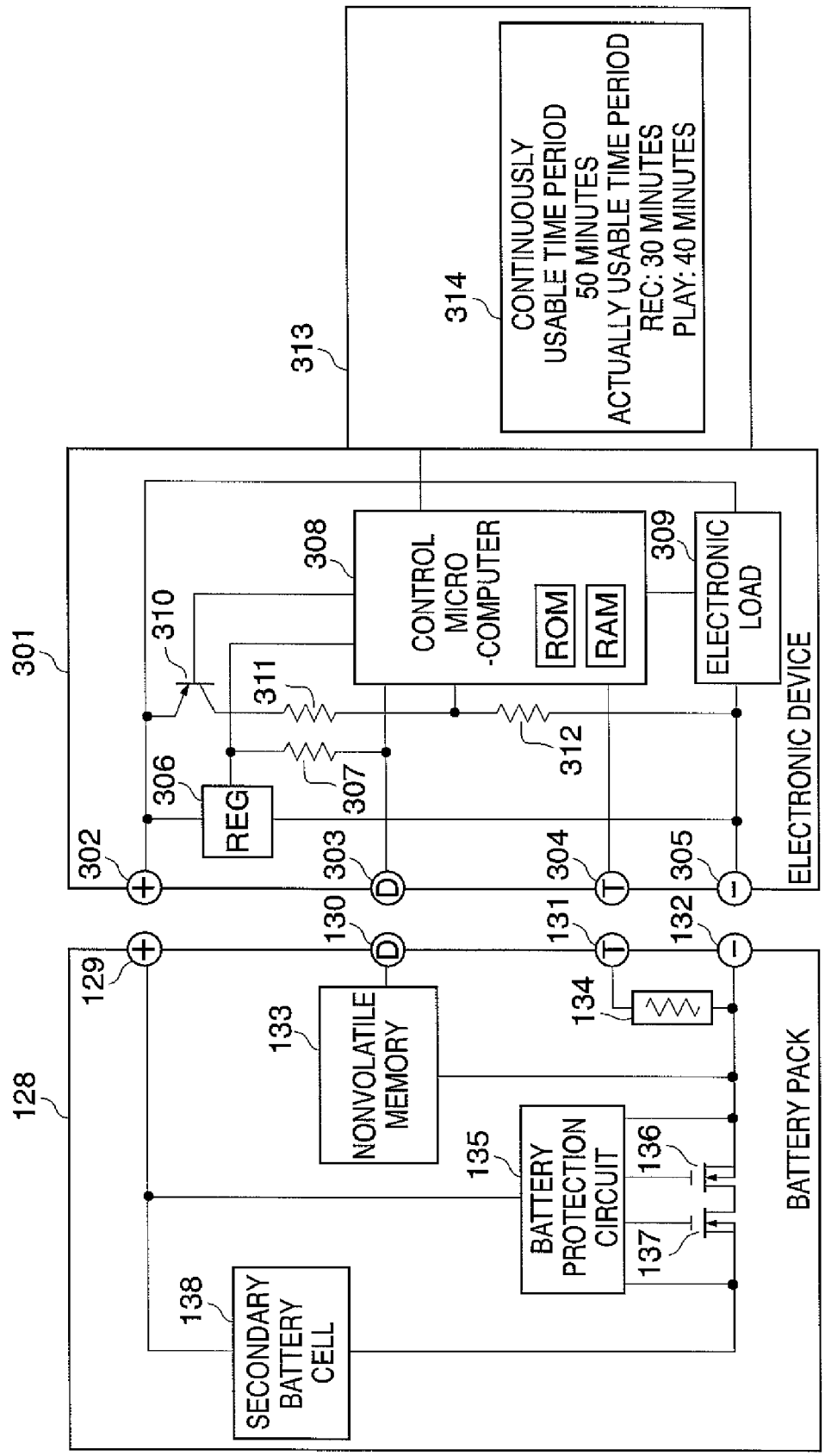
FIG. 18 is a block diagram of the internal configuration of each of an electronic device and the battery pack according to the embodiment of the present invention.

FIG. 18 is a block diagram of the internal configuration of each of the electronic device and the battery pack according to the present embodiment. It should be noted that component parts and elements identical to those in FIG. 1 are denoted by identical reference numerals, and description thereof is omitted.

Referring to FIG. 18, the electronic device 301 is implemented e.g. by a digital camera or a digital video camera using the battery pack 128 as a power supply.

When the battery pack 128 is mounted on the electronic device 301, a plus terminal 302 of the electronic device 301 is brought into contact with the plus terminal 129 of the battery pack 128 for electrical connection. When the battery pack 128 is mounted on the electronic device 301, a communication (D) terminal 303 is brought into contact with the communication (D) terminal 130 of the battery pack 128 for electrical connection. When the battery pack 128 is mounted on the electronic device 301, a temperature (T) terminal 304 is brought into contact with the temperature (T) terminal 131 of the battery pack 128 for electrical connection. When the battery pack 128 is mounted on the electronic device 301, a minus terminal 305 is brought into contact with the minus terminal 132 of the battery pack 128 for electrical connection.

A regulator (REG) 306 supplies a predetermined DC to a control microcomputer 308. A resistor 307 is a pull-up resistor. Resistors 311 and 312 are voltage-dividing resistors for measuring an output voltage from the battery pack 128. An electronic load 309 represents a load of the electronic device 301, which varies with an operation mode. The operation mode signifies a kind of an operation that can be performed by the electronic device 301. In the present embodiment, it is assumed that the electronic device 301 is a digital camera, and hence a shooting mode (REC mode) for picking up an image, a reproduction mode (PLAY mode) for reproducing a picked-up image, and so forth can be supposed to be provided as operation modes.

The control microcomputer 308 is a control circuit including a nonvolatile RAM and a nonvolatile ROM. The control microcomputer 308 is capable of measuring an output voltage from the battery pack 128 by the resistors 311 and 312 (output voltage-measuring unit), and measuring temperature of the battery pack 128 by the thermistor 134 provided therein. Further, the control microcomputer 308 reads out data and table information shown in FIG. 2 from the nonvolatile memory 133 of the battery pack 128, and determines the charged state of the battery pack 128 based on the read-out data and table information. Furthermore, the control microcomputer 308 accesses the nonvolatile memory 133 of the battery pack 128 to read out or write various kinds of data from/in the nonvolatile memory 133.

Further, the control microcomputer 308 detects an operation mode to which the electronic device 301 has been set and counts operation time over which an operation is performed in the operation mode. Then, the control microcomputer 308 calculates power consumption based on the counted operation time and an operation mode-specific power consumption data table stored in the ROM of the control microcomputer 308. The control microcomputer 308 rewrites the charge state data 1 and 2 stored in the nonvolatile memory 133 of the battery pack 128, based on the calculated power consumption.

A transistor 310 is a switch that turns on when the control microcomputer 308 measures the output voltage from the battery pack 128. Although in the present embodiment shown in FIG. 18, the transistor 310 is used, an FET switch is used when more accurate measurement is required. A display section 313 is comprised of an LCD (Liquid Crystal Display), a CVF (Contact View Finder), LEDs (Light Emitting Diodes), and so forth. A display screen 314 is an example of a screen displayed on the display section 313. On the display screen 314, a continuously usable time period and an actually usable time period are displayed to give an indication of the remaining capacity of the battery pack 128.

When the battery pack 128 is mounted on the electronic device 301, the plus terminal 302 of the electronic device 301 is connected to the plus terminal 129 of the battery pack 128, and the minus terminal 305 of the electronic device 301 is connected to the minus terminal 132 of the battery pack 128. At the same time, the communication (D) terminal 303 of the electronic device 301 is connected to the communication (D) terminal 130 of the battery pack 128, and the temperature (T) terminal 304 of the electronic device 301 is connected to the temperature (T) terminal 131 of the battery pack 128. Then, when the output voltage from the battery pack 128 is applied to the regulator 306, the regulator 306 applies a stable voltage to the control microcomputer 308.

Figure 19:
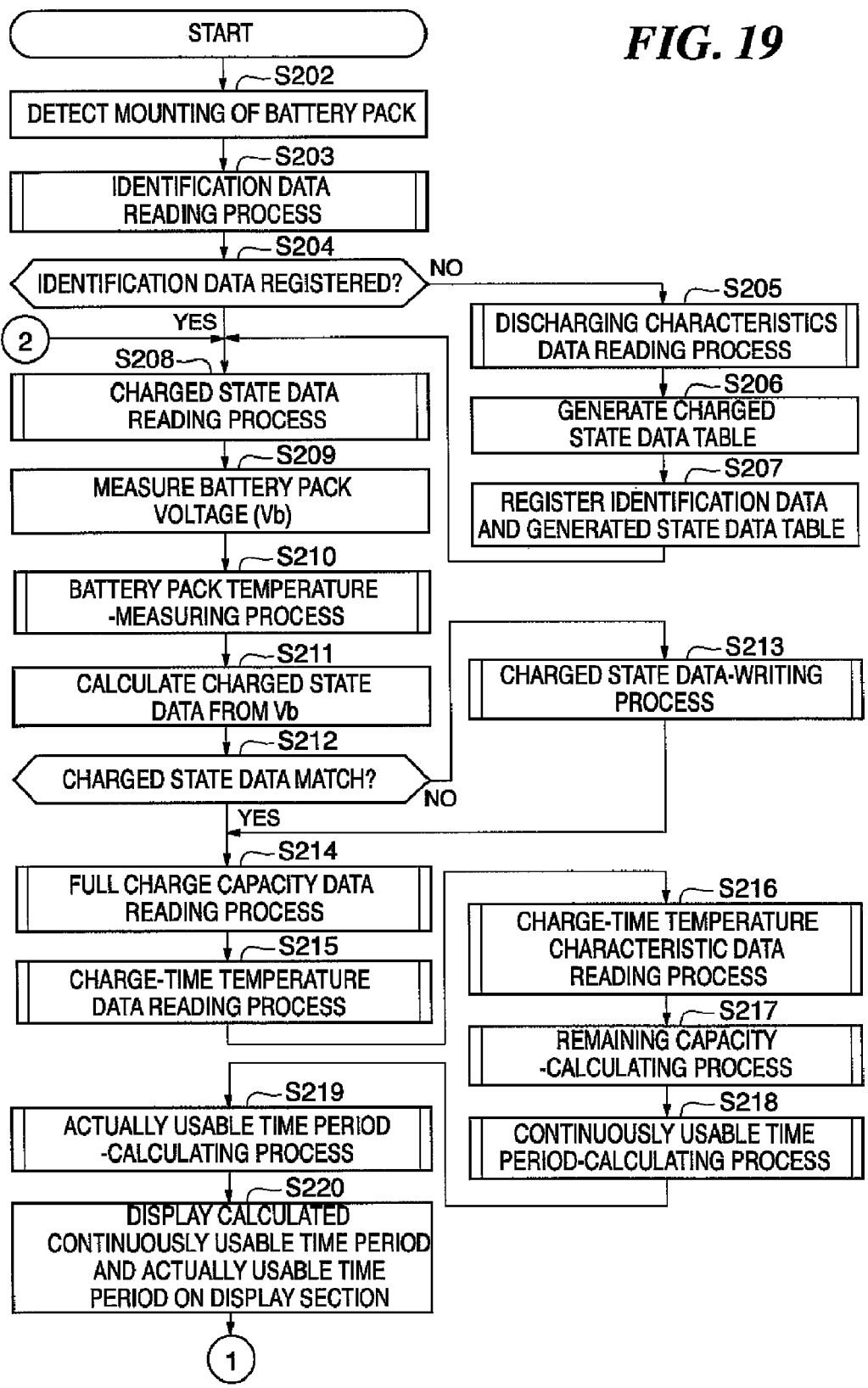
FIG. 19 is a flowchart of an operation process executed by the electronic device with the battery pack mounted therein.
Figure 20:
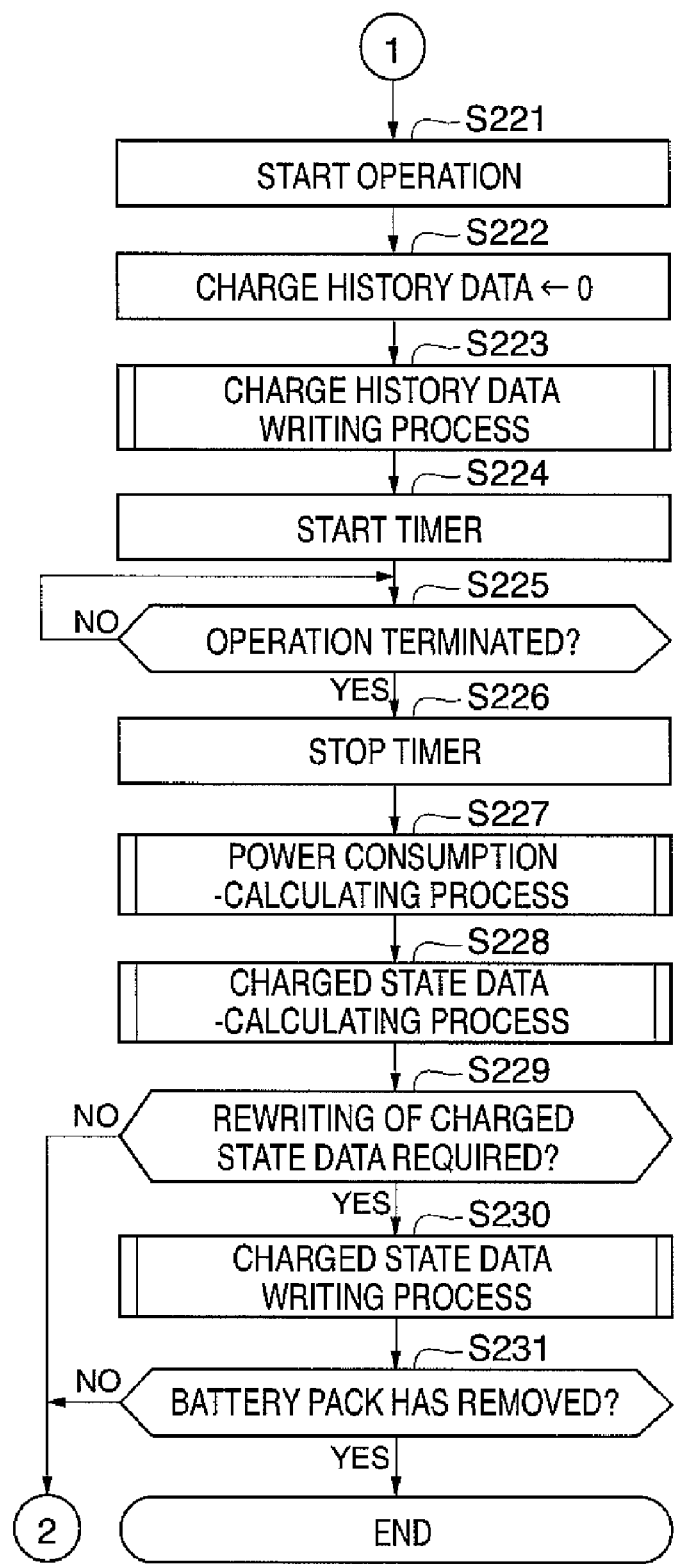
FIG. 20 is a continued part of the operation process shown in FIG. 19.

FIGS. 19 and 20 are a flowchart of an operation process executed by the electronic device 301 having the battery pack 128 mounted therein.

Referring to FIG. 19, the control microcomputer 308 detects mounting of the battery pack 128 (step S202), and reads out identification data from the nonvolatile memory 133 of the battery pack 128 via the communication terminals 303 and 130 (step S203). In reading out the identification data from the nonvolatile memory 133, the control microcomputer 308 executes the data reading process shown in FIG. 5.

Then, in a step S204, the control microcomputer 308 determines whether or not the identification data read out in the step S203 has been stored (registered) in the ROM thereof. If the identification data has not been registered in the ROM of the control microcomputer 308, the process proceeds to a step S205, whereas if the identification data has been registered in the ROM, the process proceeds to a step S208.

The ROM of the control microcomputer 308 stores, in advance, identification data items associated with respective battery pack models and discharge-time charged state data tables associated with the respective identification data items. The control microcomputer 308 reads out a discharge-time charged state data table associated with the identification data read out in the step S103 from the ROM thereof.

On the other hand; if the identification data and the discharge-time charged state data table associated with the identification data are not stored in the ROM of the control microcomputer 308, the steps S205 and the following steps S206 and S207 are executed. This is because when the electronic device 301 had been sold before the battery pack became commercial as a new product, the identification data of the new battery pack and a discharge-time charged state data table associated with the identification data have not been stored yet in the ROM of the control microcomputer 308.

In the step S205, the control microcomputer 308 reads out the discharging characteristics data from the nonvolatile memory 133 of the battery pack 128. In reading out the discharging characteristics data, the control microcomputer 308 executes the data reading process shown in FIG. 5.

Then, in the step S206, the control microcomputer 308 generates a discharge-time charged state data table based on the discharging characteristics data read out in the step S205. The control microcomputer 308 generates the discharge-time charged state data table by applying numerical values read out as the discharging characteristics data to an empty data table.

Next, in the step S207, the control microcomputer 308 registers (stores) the identification data read out in the step S203 and the discharge-time charged state data table generated in the step S206 in the RAM in a state associated with each other, followed by the process proceeding to the step S208.

It should be noted that in stead of registering the discharge-time charged state data tables in advance in the ROM in the control microcomputer 308, the control microcomputer 308 may be configured to read out the discharging characteristics data from the nonvolatile memory 133 of the battery pack 128 and generates a discharge-time charged state data table based on the discharging characteristics data. In this method, a discharge-time charged state data table is generated whenever the present process is started, so that the control microcomputer 308 can dispense with the nonvolatile RAM.

Figure 28:
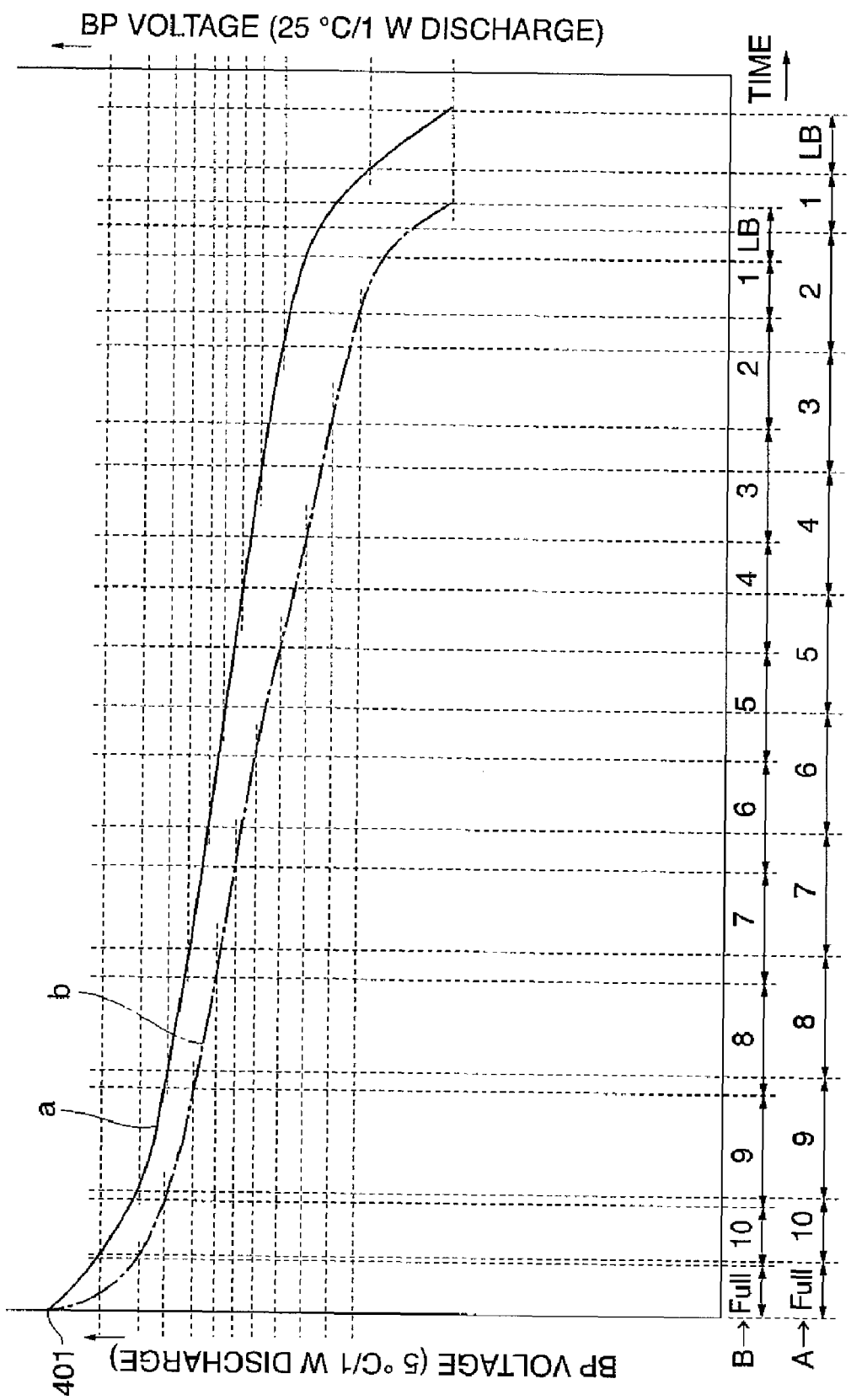
FIG. 28 is a diagram useful in explaining the relationship between the discharge-time temperature characteristic of the battery pack and the charged state data 1.
Figure 29:
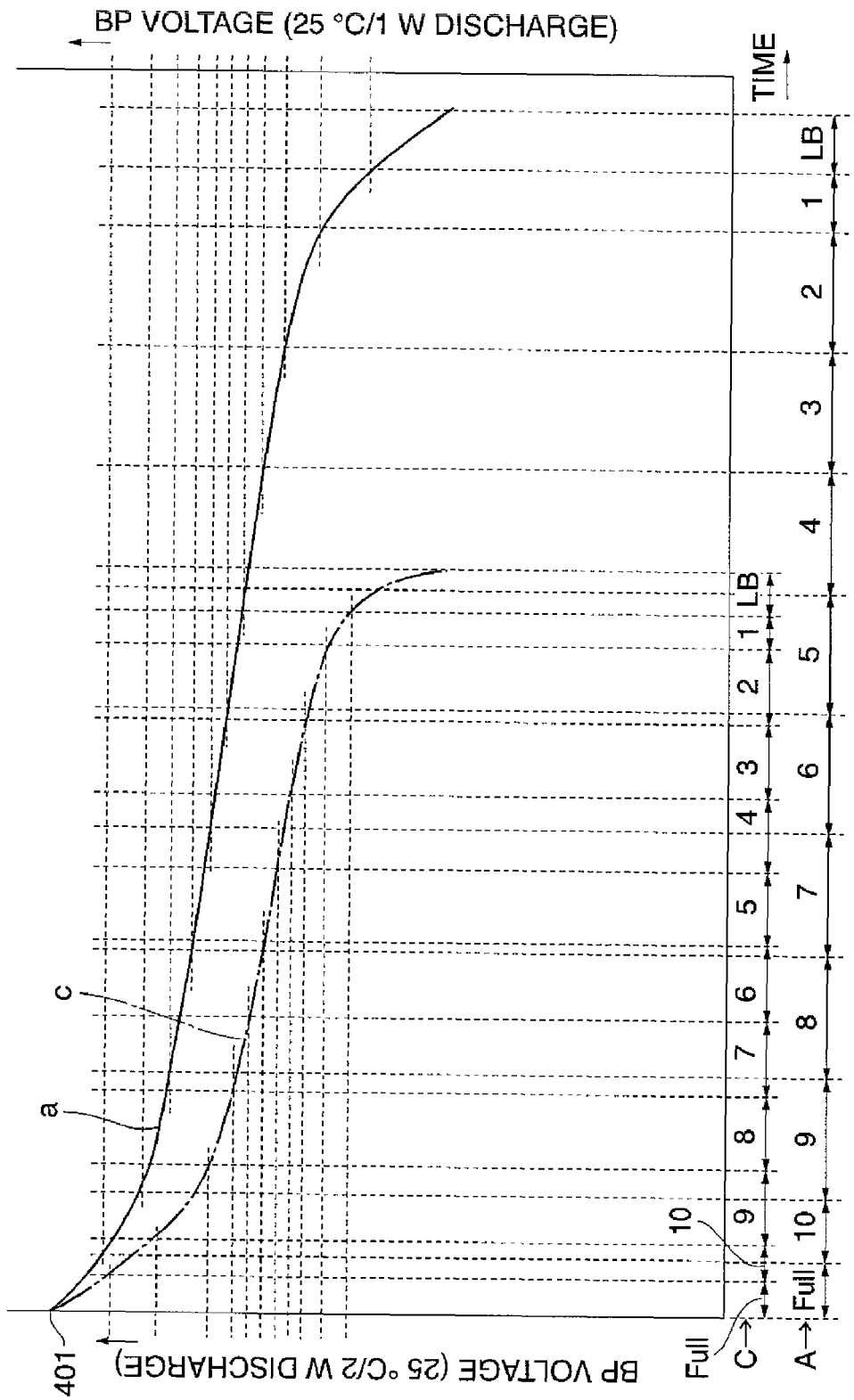
FIG. 29 is a diagram useful in explaining the relationship between the discharge load characteristic of the battery pack and the charged state data 1.

FIGS. 26A to 26C are diagrams each showing an example of a discharge-time charged state data table, and FIG. 27 is a diagram showing FIG. 26A in more detail. FIG. 28 is a diagram useful in explaining the relationship between the discharge-time temperature characteristic of the battery pack 128 and the charged state data 1. The discharging characteristics in FIG. 28 are represented by respective battery (BP) voltage curves at a discharge-time temperature of 5° C. and a discharge-time temperature of 25° C. FIG. 29 is a diagram useful in explaining the relationship between the discharge load characteristic of the battery pack 128 and the charged state data 1.

The discharge-time charged state data table is formed by associating the charged state data 1 and 2 indicative of the levels of the charged state of the battery pack 128 with the discharging characteristics data.

The discharge-time charged state data tables shown in FIGS. 26A to 26C show the relationship between the charged state data 1, the output voltage, the ratio of the remaining capacity to the full charge capacity, and the remaining capacity, exhibited when the full charge capacity is 700 mAh and the discharge output is 1 W, at a temperature range of not lower than 15° C. and lower than 35° C., a temperature range of lower than 15° C., and a temperature range of not lower than 35° C., respectively. The discharge-time charged state data tables are thus set as different tables according to the discharge-time temperature ranges.

Each discharge-time charged state data table defines charged state data 1 in which the charged state of the battery pack 128 is divided into twelve levels of LB, States 1 to 10, and Full according to the output voltage. For example, under the conditions of the full charge capacity being 700 mAh, the charge-time temperature being not lower than 15° C. and lower than 35° C., the discharge output being 1 W, and the discharge-time temperature being 5° C., if the output voltage (Vb) is in a range of $3.36 \text{ V} \leq \text{Vb} < 3.44$ V, the charged state data 1 is defined as State 3, and it is determined that the full charge capacity ratio is in a range of 21 to 30%, and the remaining capacity is in a range of 132.3 to 189 mAh. Full charge capacity efficiency in charging performed at a temperature not lower than 15° C. and lower than 35° C. is 1 (see FIG. 30), and a correction value set in the discharge-time temperature load characteristic data table in association with a discharge-time temperature of lower than 15° C. and a discharge output of 1 W is 0.9 (see FIG. 33). Therefore, when the full charge capacity ratio is 100%, the remaining capacity is calculated as 700×0.9=630 mAh (assuming that charging was performed at a temperature of 5° C. (charge-time temperature being 5° C.), the remaining capacity is calculated as 630×0.92=579.6 mAh).

Further, in the discharge-time charged state data table, as shown in more detail in FIG. 27 corresponding to FIG. 26A, the levels of the charged state data 1 are each sub-divided into a plurality of levels, and the sub-divided levels are defined as the charged state data 2. The discharge-time charged state data table and the charge-time charged state data table are defined such that the charged state data 1 and 2 match each other. That is, in the discharge-time charged state data table in FIG. 27, similarly to the charge-time charged state data table in FIG. 12, each of States 2 to 9 of the charged state data 1 is divided into ten levels, and a combined range of State 1 and LB and a combined range of State 10 and Full are each divided into ten levels.

FIG. 28 shows discharging characteristics represented by output voltage curves obtained when the discharge load is a constant electric power of 1 W, at respective discharge-time temperatures of 5° C. and 25° C. Reference numeral 401 denotes open-circuit voltage obtained when the battery pack 128 is fully charged. LB voltage is a lower limit voltage required for normal operation of the electronic device 301.

Reference symbol "a" in FIG. 28 denotes a discharging characteristics curve (output voltage curve) of the battery pack 128 exhibited when discharging is performed under the conditions of the discharge-time temperature being 25° C. and the discharge output being 1 W. On the other hand, reference symbol "b" in FIG. 28 denotes a discharging characteristics curve (output voltage curve) of the battery pack 128 exhibited when discharging is performed under the conditions of the discharge-time temperature being 5° C. and the discharge output being 1 W. Reference symbol "A" in FIG. 28 denotes a discharge-time charged state data table corresponding to the discharging characteristics curve "a", and reference symbol "B" denotes a discharge-time charged state data table corresponding to the discharging characteristics curve "b". As shown in FIG. 28, as the discharge-time temperature is lower, the battery usable time becomes shorter even when the load (discharge output) condition remains unchanged, so that ranges indicating the respective charged states of the battery pack 128 are set according to the discharge-time temperature.

FIG. 29 shows discharging characteristics represented by output voltage curves obtained when the discharge-time temperature is 25° C., at respective discharge loads of a constant electric power of 1 W and a constant electric power of 2 W. Reference symbol "a" in FIG. 29 denotes a discharging characteristics curve associated with discharging of the battery pack 128 performed under the conditions of the discharge-time temperature being 25° C. and the discharge output being 1 W. On the other hand, reference symbol "c" in FIG. 29 denotes a discharging characteristics curve associated with discharging of the battery pack 128 performed under the conditions of the discharge-time temperature being 25° C. and the discharge output being 2 W. Reference symbol "A" in FIG. 29 denotes a discharge-time charged state data table corresponding to the discharging characteristics curve "a", and reference symbol "C" denotes a discharge-time charged state data table corresponding to the discharging characteristics graph "c". As shown in FIG. 29, as the load (discharge output) is larger, the battery usable time becomes shorter, so that ranges indicating the respective charged states of the battery pack 128 are set according to the load.

Referring again to FIG. 19, in the step S208, the control microcomputer 308 reads out the charged state data 1 and 2 from the nonvolatile memory 133 of the battery pack 128 into the RAM of the control microcomputer 308. In reading out the charged state data 1 and 2, the control microcomputer 308 executes the data reading process shown in FIG. 5.

In a step S209, the control microcomputer 308 measures the output voltage Vb from the battery pack 128 via the resistors 311 and 312. In a step S210, the control microcomputer 308 measures the temperature of the battery pack 128 by the thermistor 134 in the battery pack 128 (battery pack temperature-measuring process). In measuring the temperature of the battery pack 128, the control microcomputer 308 executes the battery pack temperature-measuring process shown in FIG. 7.

In steps S211 to S213, self-discharge correction is executed. Self-discharge is a phenomenon that when a battery pack is left unused or mounted on an electronic device without being used, the charge capacity of the battery pack naturally decreases due to internal resistance of the secondary battery cell 138 of the battery pack 128 or leakage of electric current to an electronic device. When self-discharge occurs in the battery pack 128, the charge capacity of the battery pack 128 decreases, which causes a discrepancy between the charged state data stored in the nonvolatile memory 133 of the battery pack 128 and the present charged state data.

To solve this problem, according to the present embodiment, when the charged state data 1 calculated based on the output voltage Vb of the battery pack 128 does not match the charged state data 1 stored in the nonvolatile memory 133 of the battery pack 128, the latter is updated. This makes it possible to hold the correct charged state data of the battery pack.

In the step S211, a temperature-specific discharge-time charged state data table is referred to, whereby the charged state data 1 and 2 corresponding to the output voltage Vb measured in the step S209 are calculated. The temperature-specific discharge-time charged state data table is one stored in the ROM of the control microcomputer 308 or generated in the steps S205 to S207.

Then, in the step S212, the control microcomputer 308 makes a comparison between the charged state data 1 read out in the step S208 and the charged state data 1 calculated in the step S211, to thereby determine whether or not they match each other. If they match each other, the process proceeds to a step S214, whereas if not, the process proceeds to the step S213.

In the step S213, the control microcomputer 308 writes the charged state data 1 and 2 calculated in the step S211 in the data addresses of the charged state data 1 and 2 in the nonvolatile memory 133 to thereby update the charged state data 1 and 2 in the nonvolatile memory 133. In writing the charged state data 1 and 2 in the nonvolatile memory 133, the control microcomputer 308 executes the data writing process shown in FIG. 6. It should be noted that although not shown, self-discharge correction in the steps S211 to S213 is executed only once for a first-time execution of the present process after the battery pack is mounted, but not for a second or later-time execution of the same. This is to calculate the remaining capacity based on the power consumption on a priority basis.

Next, in the step S214, the control microcomputer 308 reads out the full charge capacity data from the nonvolatile memory 133 of the battery pack 128. In reading out the full charge capacity data, the control microcomputer 308 executes the data reading process shown in FIG. 5.

In a step S215, the control microcomputer 308 reads out the charge-time temperature data stored in the nonvolatile memory 133 of the battery pack 128. Then, in a step S216, the control microcomputer 308 reads out the charge-time temperature characteristic data from the nonvolatile memory 133 of the battery pack 128. In reading data in each of the steps S215 and S216, the data reading process shown in FIG. 5 is executed.

FIG. 30 is a diagram showing an example of the charge-time temperature characteristic data table.

Referring to FIG. 30, the charge-time temperature characteristic data is for correcting a change in the full charge capacity of the battery pack 128 due to the charge-time temperature. In the present embodiment, when the full charge capacity at a charge-time temperature of 25° C. is defined as 1, full charge capacity efficiency at a charge-time temperature of 5° C. is set to 0.92, and full charge capacity efficiency at a charge-time temperature of 35° C. is set to 1.02.

Referring again to FIG. 19, in the step S217, the control microcomputer 308 calculates the remaining capacity of the battery pack 128 based on the full charge capacity data, the temperature, the charge-time temperature data, the charge-time temperature characteristic data, and the charged state data 1 and 2 (remaining capacity-calculating process).

Figure 21:
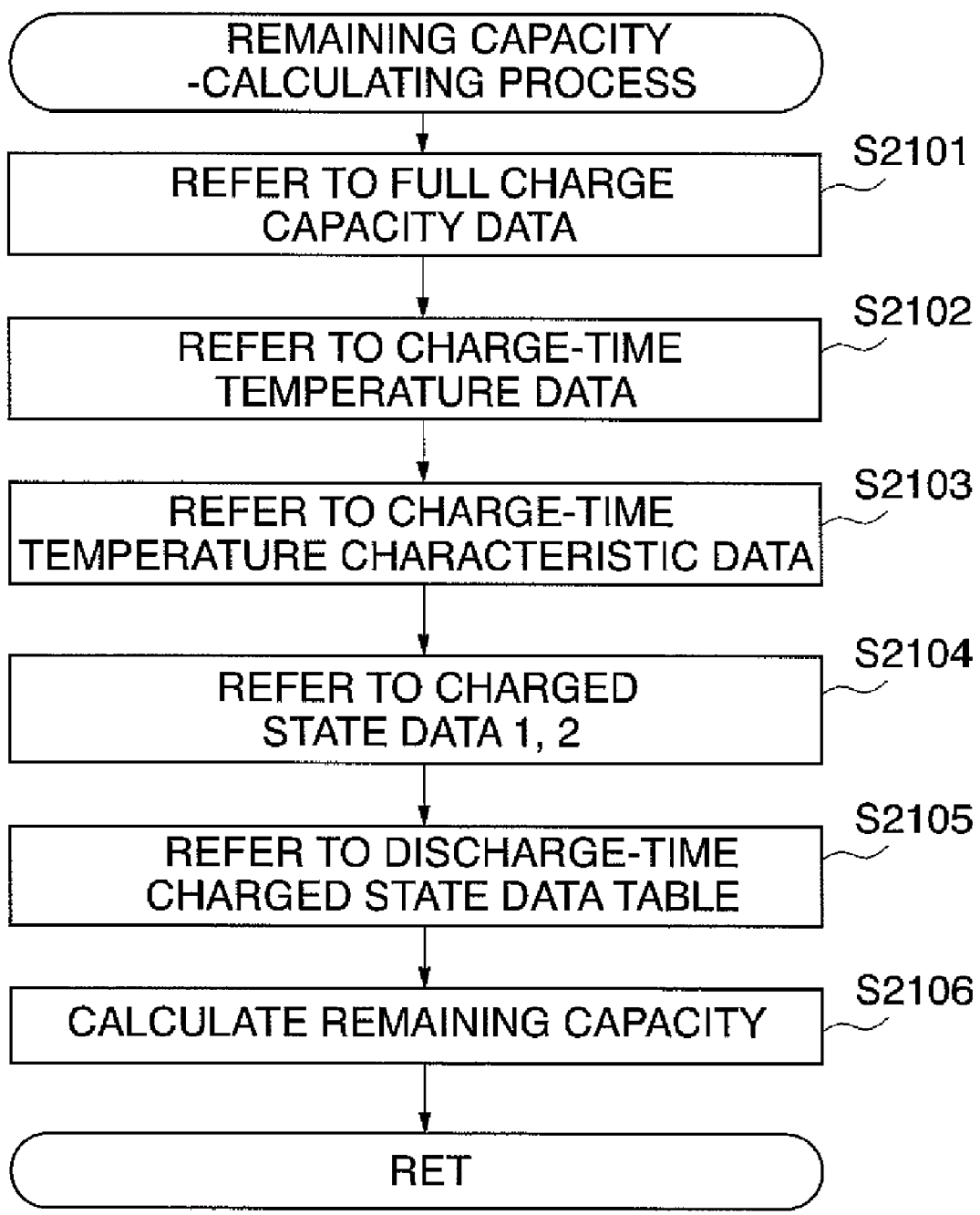
FIG. 21 is a flowchart showing details of a remaining capacity-calculating process executed in a step S217 in FIG. 19.

FIG. 21 is a flowchart showing details of the remaining capacity-calculating process executed in the step S217 in FIG. 19.

Referring to FIG. 21, in a step S2101, the control microcomputer 308 refers to the full charge capacity data read out in the step S213. Then, in a step S2102, the control microcomputer 308 refers to the charge-time temperature data read out in the step S215. Further, in a step S2103, the control microcomputer 308 refers to the charge-time temperature characteristic data read out in the step S216.

Next, in a step S2104, the control microcomputer 308 refers to the charged state data 1 and 2 stored in the nonvolatile memory 133 of the battery pack 128. Then, in a step S2105, the control microcomputer 308 refers to the discharge-time charged state data table.

Thereafter, in a step S2106, the control microcomputer 308 identifies a full charge capacity efficiency associated with the charge-time temperature data based on the charge-time temperature characteristic data, and multiplies the full charge capacity data by the full charge capacity efficiency to thereby correct the full charge capacity data. Then, the control microcomputer 308 calculates the remaining capacity of the battery pack 128 by referring to the discharge-time charged state data table corresponding to the discharge-time temperature according to the charged state data 1 and 2, followed by returning to the main flow.

Referring again to FIG. 19, in the step S218, the control microcomputer 308 calculates the continuously usable time period of the battery pack 128 (continuously usable time period-calculating process).

Figure 22:
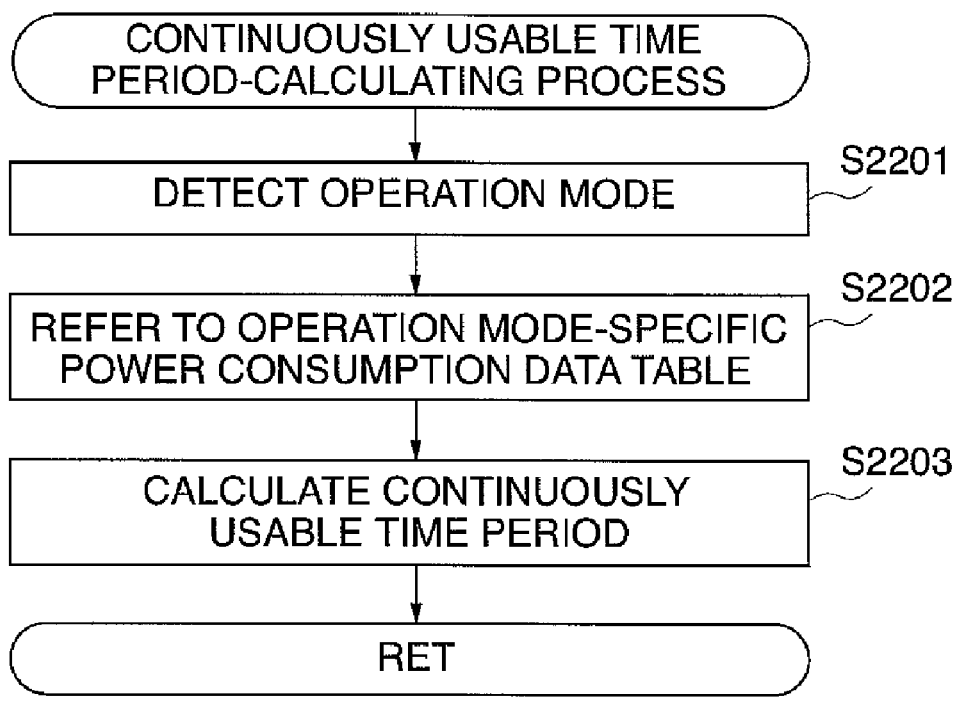
FIG. 22 is a flowchart showing details of a continuously usable time period-calculating process executed in a step S218 in FIG. 19.

FIG. 22 is a flowchart showing details of the continuously usable time period-calculating process executed in the step S218 in FIG. 19.

Referring to FIG. 22, in a step S2201, the control microcomputer 308 detects an operation mode to which the electronic device 301 has been set. In the following step S2202, the control microcomputer 308 refers to the power consumption data table stored in the ROM of the control microcomputer 308, to thereby calculate power consumption associated with the operation mode detected in the step S2201. FIG. 31 shows an example of the power consumption data table. In the power consumption data table, power consumption per unit time is defined in association with each operation mode of the electronic device 301.

Then, in a step S2203, the control microcomputer 308 calculates the continuously usable time period associated with the detected operation mode by dividing the remaining capacity of the battery pack 128 calculated in the step S217 by the power consumption calculated in the step S2202, followed by returning to the main flow.

Referring again to FIG. 19, in a step S219, the control microcomputer 308 calculates an actually usable time period based on the continuously usable time period calculated in the step S218 (actually usable time period-calculating process).

Figure 23:
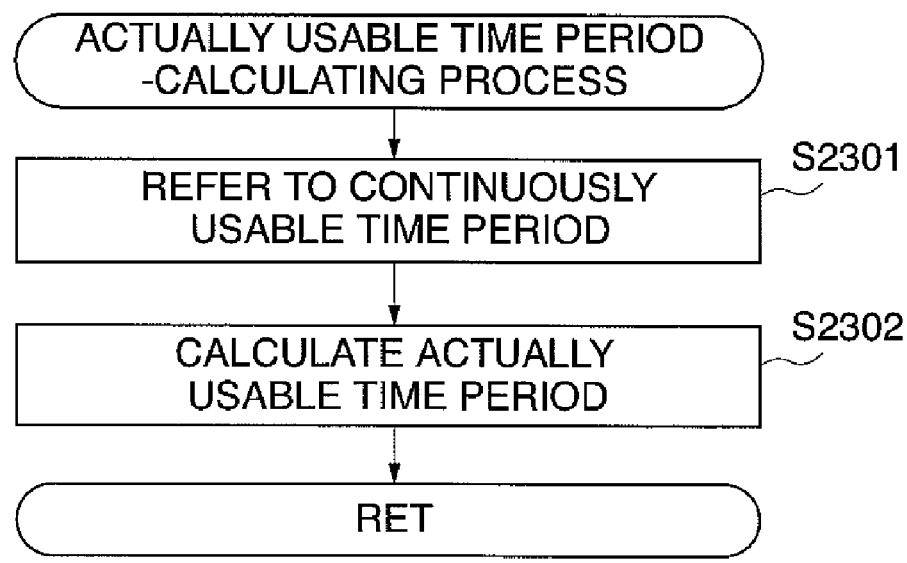
FIG. 23 is a flowchart showing details of an actually usable time period-calculating process executed in a step S219 in FIG. 19.

FIG. 23 is a flowchart showing details of the actually usable time period-calculating process executed in the step S219 in FIG. 19.

Referring to FIG. 23, in a step S2301, the continuously usable time period calculated in the step S218 is referred to. Then, in a step S2302, an appropriate actually usable time coefficient is selected from an actually usable time coefficient data table stored in advance in the ROM of the microcomputer 308, and the continuously usable time period is multiplied by the selected actually usable time coefficient to thereby calculate the actually usable time period, followed by the process returning to the main flow.

An actually usable time coefficient is obtained by converting power consumption e.g. during shooting standby, zooming, and the like operations generally performed in the shooting mode into a constant. FIG. 32 shows an example of the actually usable time coefficient data table stored in advance in the ROM within the microcomputer 308. In the actually usable time coefficient data table, actually usable time coefficients are defined in association with respective operation modes.

Referring again to FIG. 19, in a step S220, the control microcomputer 308 performs control such that the continuously usable time period calculated in the step S218 and the actually usable time period calculated in the step S219 are displayed on the display section 313 of the electronic device 301.

Referring to FIG. 20, in a step S221, the control microcomputer 308 starts an operation associated with the operation mode to which the electronic device 301 has been set. In the present embodiment, since the electronic device 301 is a digital camera, when the operation mode is the shooting mode, a shooting operation is started, and when the operation mode is the reproduction mode, a reproduction operation is started. Then, in a step S222, the control microcomputer 308 writes 0 in the data address of the charge history data stored in the nonvolatile memory 133 of the battery pack 128. In writing the charge history data, the control microcomputer 308 executes the data writing process shown in FIG. 6.

In steps S224 to S226, the control microcomputer 308 counts operation time over which the electronic device 301 has operated in the operation mode since it started to operate in the operation mode in the step S211, using a timer. It is assumed that the timer for use in counting the operation time is incorporated in the control microcomputer 308.

Then, in a step S277, the control microcomputer 308 calculates power consumption (power consumption-calculating process).

Figure 24:
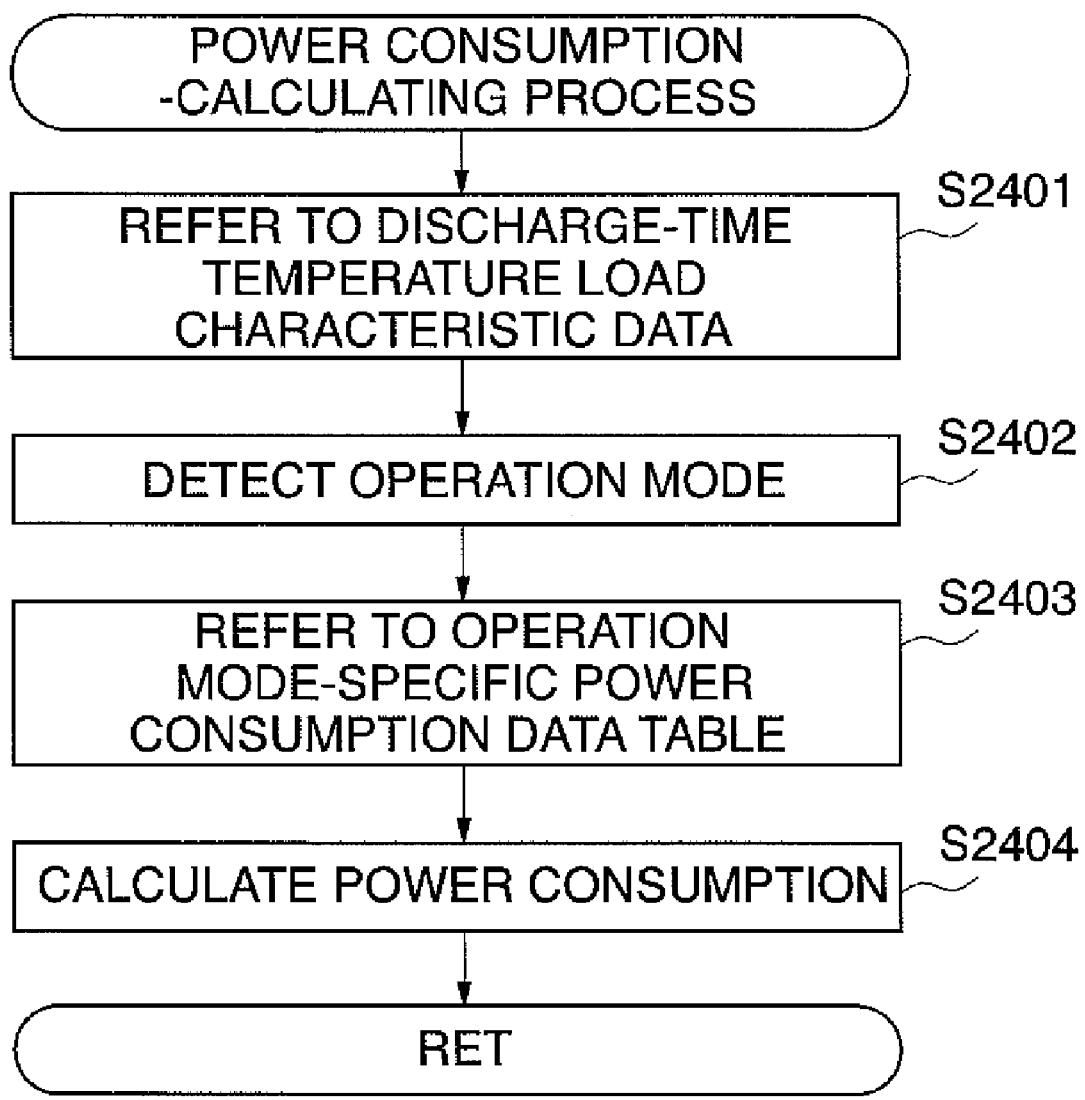
FIG. 24 is a flowchart showing details of a power consumption-calculating process executed in a step S227 in FIG. 20.

FIG. 24 is a flowchart showing details of the power consumption-calculating process executed in the step S227 in FIG. 20.

Referring to FIG. 24, in a step S2401, the control microcomputer 308 refers to the discharge-time temperature load characteristic data table stored in the nonvolatile memory 133 of the battery pack 128. As shown in FIG. 33, the discharge-time temperature load characteristic data table is a correction table for use in correcting power consumption based on the temperature during discharging.

Next, in a step S2402, the control microcomputer 308 detects the present operation mode of the electronic device 301. In the following step S2403, the control microcomputer 308 refers to the power consumption data table stored in the ROM of the control microcomputer 308, to thereby identify power consumption associated with the operation mode detected in the step S2402. Then, in a step S2404, the power consumption identified in the step S2403 is multiplied by the operation time counted in the steps S224 to S226, whereby the power consumption associated with the operation mode is calculated. Further, the calculated power consumption is corrected based on the discharge-time temperature load characteristic data table referred to in the step S2401, followed by the process returning to the main flow.

Referring again to FIG. 20, in the step S228, a charged state data-calculating process is executed.

Figure 25:
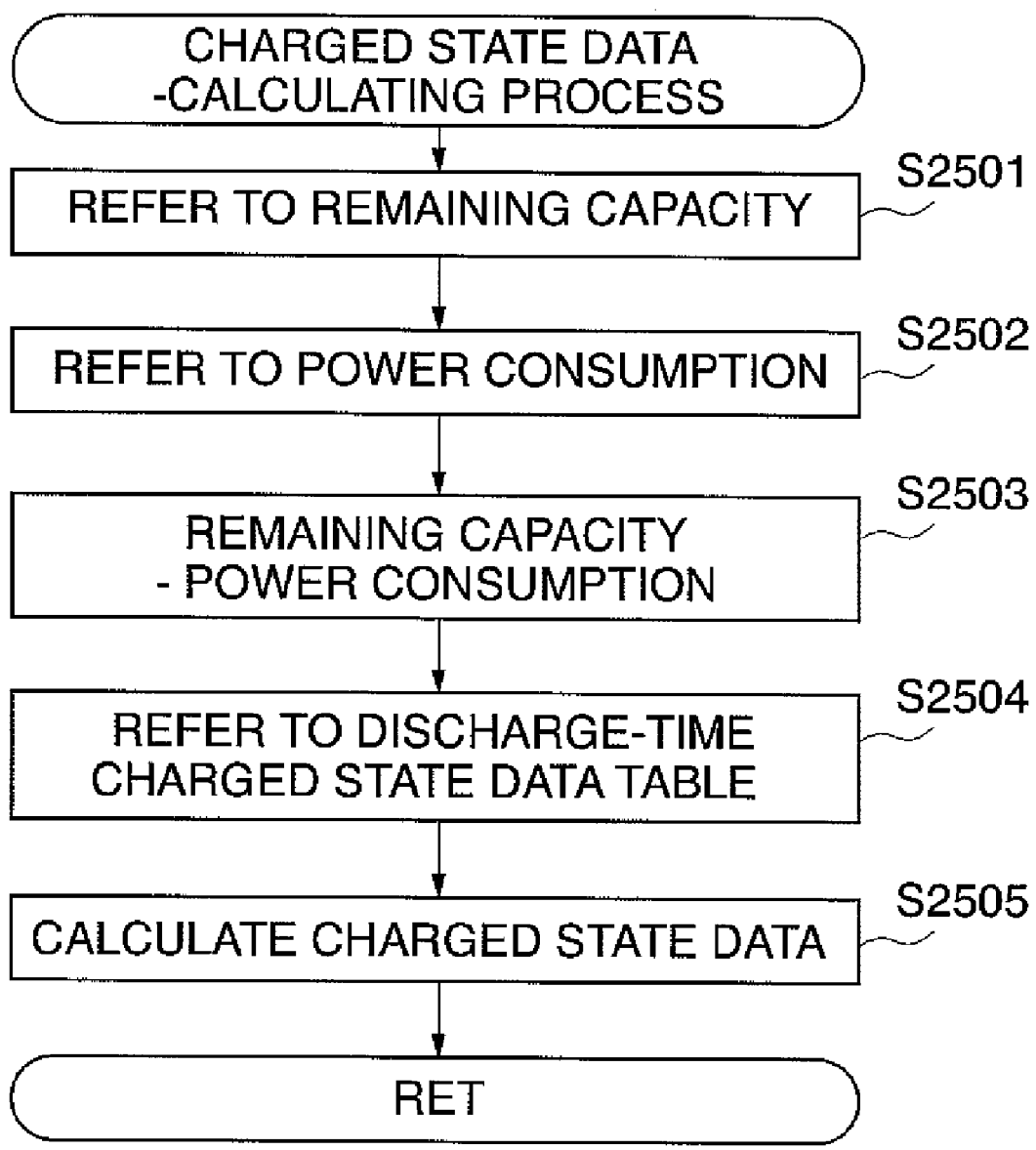
FIG. 25 is a flowchart showing details of a charged state data-calculating process executed in a step S228 in FIG. 20.

FIG. 25 is a flowchart showing details of the charged state data-calculating process executed in the step S228 in FIG. 20.

Referring to FIG. 25, in a step S2501, the remaining capacity calculated in the step S217 is referred to. In a step S2502, the power consumption calculated in the step S227 is referred to. In a step S2503, the power consumption is subtracted from the remaining capacity, whereby a remaining capacity of the battery pack 128 upon termination of the operation mode is calculated. In a step S2504, a discharge-time charged state data table associated with the temperature measured in the step S210 is referred to. In a step S2505, the charged state data 1 and 2 upon termination of the operation mode are calculated from the discharge-time charged state data table referred to in the step S2504, based on the remaining capacity calculated in the step S2503, followed by the process returning to the main flow.

Referring again to FIG. 20, in a step S229, the microcomputer 308 makes a comparison between the charged state data 1 and 2 in the nonvolatile memory 133 and the charged state data 1 and 2 calculated in the step S228, to thereby determine whether or not rewriting of the charged state data is required. If it is determined by the comparison that the charged state data 1 and 2 in the nonvolatile memory 133 and the charged state data 1 and 2 calculated in the step S228 match each other, the microcomputer 308 judges that rewriting of the charged state data is not required, and the process returns to the step S208. On the other hand, if the charged state data 1 and 2 in the nonvolatile memory 133 and the charged state data 1 and 2 calculated in the step S228 do not match each other, the microcomputer 308 judges that rewriting of the charged state data is required, and the process proceeds to a step S230.

In the step S230, the control microcomputer 308 writes the charged state data 1 and 2 calculated in the step S228 in the data addresses of the charged state data 1 and 2 in the nonvolatile memory 133 of the battery pack 128. In writing the charged state data 1 and 2 in the nonvolatile memory 133, the control microcomputer 308 executes the data writing process shown in FIG. 6.

Then, in a step S231, the microcomputer 308 carries out removal detection to detect whether or not the battery pack 128 has been removed from the electronic device 301. If removal of the battery pack 128 from the electronic device 301 is detected, the present process is terminated. If removal of the battery pack 128 from the electronic device 301 is not detected, the process returns to the step S208. In detecting the removal, it is determined e.g. when the electronic device-side temperature (T) terminal 304 is open that the battery pack 128 has been removed.

According to the above described embodiment, it is possible to accurately manage the charge-time charged state of the battery pack 128 being charged by the charging device 101. Further, it is possible to accurately manage the remaining capacity of the battery pack 128 mounted on the electronic device 301 and display the remaining capacity with higher accuracy. Furthermore, temperature characteristics during charging and during discharging can be reflected in display of the remaining capacity of the battery pack 128, which makes it possible to enhance accuracy in remaining-capacity display. What is more, it is not necessary to provide a device for measuring an electric current value in the power supply line, which makes it possible to perform remaining-capacity display with excellent power efficiency by the small-sized and low-cost device.

Although in the above described embodiment, the temperature for use during each of charging and discharging is divided into three ranges for management, it is also possible to subdivide the ranges and store data associated with each of the subdivided temperature ranges. Further, when the memory capacity is limited, it is possible to calculate temperature-specific charging characteristics data items and discharging characteristics data items by interpolation to thereby generate the charge-time and discharge-time charged state data tables. This makes it possible to manage the state of the remaining capacity with higher accuracy.

In the above described embodiment, the electronic device 301 is not limited to a digital camera or a digital video camera, but it may be an information terminal apparatus, such as a cellular phone, a notebook personal computer, or a PDA. Further, although the thermistor 134 is provided in the battery pack 128, this is not limitative, but any other device which is capable of measuring temperature can be used in place of the thermistor 134.

Furthermore, the thermistor 134 may be dispensed with. In this case, the step S112 is omitted, and only the charge-time charged state data table associated with the ambient temperature is stored in the ROM of the charge control microcomputer 118.

It is to be understood that the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2007-137095 filed May 23, 2007, which is hereby incorporated by reference herein in its entirety.

What is claimed is:

1. A charging device on which a battery pack including a memory is connected, comprising:

a charging current measuring unit that measures a charging current supplied to the battery pack;

a charging voltage measuring unit that measures a charging voltage applied to the battery pack;

a control unit that detects whether a first data table corresponding to identification data of the battery pack is stored in the charging device, and determines, if the first data table is stored in the charging device, charged state data indicating a charged state of the battery pack based on a charging current measured by the charging current measuring unit, a charging voltage measured by the charging voltage measuring unit, and the first data table;

a writing unit that stores the charged state data determined by the control unit in the memory, wherein the control unit generates a second data table by using charging characteristics data stored in the memory if the first data table is not stored in the charging device, the control unit determines the charged state data based on a charging current measured by the charging current measuring unit, a charging voltage measured by the charging voltage measuring unit, and the second data table if the first data table is not stored in the charging device, the control unit causes a display unit to display a charged state of the battery pack determined by using the first data table if the first data table is stored in the charging device, the control unit causes the display unit to display a charged state of the battery pack determined by using the second data table if the first data table is not stored in the charging device, the first data table includes a data table associated with a charging current, a charging voltage, and a charged state data, the second data table includes a data table associated with a charging current, a charging voltage, and a charged state data, and the charging characteristics data includes charging voltage, charging current, full charge capacity ratio, and remaining charge capacity.

2. A charging device according to claim 1, wherein the control unit selects the first data table for determining a charged state of the battery pack based on identification data of the battery pack stored in the memory.

3. A charging device according to claim 1, wherein the battery pack includes a temperature measuring device, the temperature measuring device is used for measuring a temperature of the battery pack, and the control unit selects the first data table for determining a charged state of the battery pack based on a temperature measured by the temperature measuring device.

4. A charging device according to claim 1, wherein the control unit corrects determined charged state data based on a number of times where charged state data determined by the control unit is stored in the memory.

5. An electronic device on which a battery pack including a memory is connected, comprising:
an output voltage measuring unit that measures an output voltage from the battery pack;
a control unit that detects whether a first data table corresponding to identification data of the battery pack is stored in the electronic device, and determines, if the first data table is stored in the electronic device, charged state data indicating a charged state of the battery pack based on an output voltage measured by the output voltage measuring unit and the first data table; and
a writing unit that stores the charged state data determined by the control unit in the memory,
wherein the control unit generates a second data table by using discharging characteristics data stored in the memory if the first data table is not stored in the electronic device,
the control unit determines the charged state data based on an output voltage measured by the output voltage measuring unit and the second data table if the first data table is not stored in the electronic device,
the control unit causes a display unit to display usable time of the battery pack determined by using the first data table if the first data table is stored in the electronic device,
the control unit causes the display unit to display usable time of the battery pack determined by using the second data table if the first data table is not stored in the electronic device
the first data table includes a data table associated with an output voltage and a charged state data,
the second data table includes a data table associated with an output voltage and a charged state data, and
the discharging characteristics data includes output voltage, discharge load, full charge capacity ratio, and remaining capacity.

6. An electronic device according to claim 5, wherein the control unit selects the first data table for determining a charged state of the battery pack based on identification data of the battery pack stored in the memory.

7. An electronic device according to claim 5, wherein the battery pack includes a temperature measuring device, the temperature measuring device is used for measuring a temperature of the battery pack, and the control unit selects the first data table for determining a charged state of the battery pack based on a temperature measured by the temperature measuring device.

8. An electronic device according to claim 5, wherein the writing unit updates charged state data determined by the control unit if the charged state data determined by the control unit is different from the charged state data stored in the memory.

9. A method of controlling a charging device on which a battery pack including a memory is connected, comprising:
a step of measuring a charging current supplied to the battery pack;
a step of measuring a charging voltage applied to the battery pack;
a step of detecting whether a first data table corresponding to identification data of the battery pack is stored in the charging device;
a step of determining charged state data indicating a charged state of the battery pack based on a measured charging current, a measured charging voltage, and the first data table if the first data table is stored in the charging device;
a step of storing determined charged state data in the memory;
a step of generating a second data table by using charging characteristics data stored in the memory if the first data table is not stored in the charging device;
a step of determining the charged state data based on a measured charging current, a measured charging voltage, and the second data table if the first data table is not stored in the charging device;
a step of causing a display unit to display a charged state of the battery pack determined by using the first data table if the first data table is stored in the charging device; and
a step of causing the display unit to display a charged state of the battery pack determined by using the second data table if the first data table is not stored in the charging device, wherein the first data table includes a data table associated with a charging current, a charging voltage, and a charged state data, the second data table includes a data table associated with a charging current, a charging voltage, and a charged state data and the charging characteristics data includes charging voltage, charging current, full charge capacity ratio, and remaining charge capacity.

10. A method of controlling an electronic device on which a battery pack including a memory is connected, comprising:
a step of measuring an output voltage from the battery pack;
a step of detecting whether a first data table corresponding to identification data of the battery pack is stored in the electronic device;
a step of determining charged state data indicating a charged state of the battery pack based on a measured output voltage and the first data table if the first data table is stored in the electronic device; and
a step of storing determined charged state data in the memory;
a step of generating a second data table by using discharging characteristics data stored in the memory if the first data table is not stored in the electronic device;

a step of determining the charged state data based on a measured output voltage, and the second data table if the first data table is not stored in the electronic device;

a step of causing a display unit to display usable time of the battery pack determined by using the first data table if the first data table is stored in the electronic device; and a step of causing the display unit to display usable time of the battery pack determined by using the second data table if the first data table is not stored in the electronic device, wherein the first data table includes a data table associated with an output voltage and a charged state data, the second data table includes a data table associated with an output voltage and a charged state data, and the discharging characteristics data includes output voltage, discharge load, full charge capacity ratio, and remaining capacity.

* * * * *